(12) United States Patent
Song et al.

(10) Patent No.: US 12,002,924 B2
(45) Date of Patent: Jun. 4, 2024

(54) PASSIVATED LLZO PARTICLES AND TAPE CASTING OF LLZO FILMS

(71) Applicant: Corning Incorporated, Corning, NY (US)

(72) Inventors: Zhen Song, Painted Post, NY (US); Michael Edward Badding, Campbell, NY (US); Jacqueline Leslie Brown, Lindley, NY (US); Brent Daniel Conway, Lindley, NY (US); Aaron David DeGeorge, Painted Post, NY (US); Yinghong Chen, Painted Post, NY (US); Jason Allen Brown, Elmira, NY (US)

(73) Assignee: CORNING INCORPORATED, Corning, NY (US)

( * ) Notice: Subject to any disclaimer, the term of this patent is extended or adjusted under 35 U.S.C. 154(b) by 393 days.

(21) Appl. No.: 17/333,339

(22) Filed: May 28, 2021

(65) Prior Publication Data

US 2022/0384841 A1 Dec. 1, 2022

(51) Int. Cl.
*H01M 10/0563* (2010.01)
*B28B 1/26* (2006.01)
(Continued)

(52) U.S. Cl.
CPC .......... *H01M 10/0562* (2013.01); *B28B 1/26* (2013.01); *C01G 25/02* (2013.01); *H01M 10/052* (2013.01); *C01P 2002/52* (2013.01); *C01P 2002/72* (2013.01); *C01P 2002/82* (2013.01); *C01P 2002/88* (2013.01); *C01P 2004/03* (2013.01); *C01P 2004/61* (2013.01);
(Continued)

(58) Field of Classification Search
CPC ... H01M 10/0562; H01M 10/052; B28B 1/26; C01G 25/02
See application file for complete search history.

(56) References Cited

U.S. PATENT DOCUMENTS 10,008,742 B2 6/2018 Holme et al.
10,622,666 B2 4/2020 Wachsman et al.
(Continued)

FOREIGN PATENT DOCUMENTS

WO WO-2018052371 A1 3/2018

OTHER PUBLICATIONS

Hitz, Gregory T., et al., "High-rate lithium cycling in a scalable trilayer Li-garnet-electrolyte architecture", Materials Today, vol. 22, (Jan./Feb. 2019), 50-57.
(Continued)

*Primary Examiner* — James A Fiorito

(57) ABSTRACT

Passivated $Li_7La_3Zr_2O_{12}$ (LLZO) particles, tape casting powders and slip compositions including the particles, methods of forming the particles, methods of tape casting using the particles, green tapes including the particles, cast LLZO films formed from the particles, and lithium batteries including the cast LLZO film. A passivated LLZO particle includes an LLZO core, wherein the LLZO is optionally doped with one or more elements. The passivated LLZO particle also includes a shell including H-LLZO, $H_3O^+$-LLZO, and/or $Li_2CO_3$.

17 Claims, 30 Drawing Sheets

(51) Int. Cl.
*C01G 25/02* (2006.01)
*H01M 10/052* (2010.01)
*H01M 10/0562* (2010.01)

(52) U.S. Cl.
CPC ...... *C01P 2004/62* (2013.01); *C01P 2004/84* (2013.01); *C01P 2006/40* (2013.01); *H01M 2300/0077* (2013.01)

(56) References Cited

U.S. PATENT DOCUMENTS

| | | |
|---|---|---|
| 10,651,502 B2 | 5/2020 | Holme et al. |
| 2016/0149267 A1 | 5/2016 | Badding et al. |
| 2018/0301754 A1 | 10/2018 | Badding et al. |
| 2018/0362360 A1* | 12/2018 | Weller .............. C01G 25/006 |
| 2019/0337817 A1* | 11/2019 | Weller .............. C09D 133/02 |

OTHER PUBLICATIONS

Liu, Boyang, "3D lithium metal anodes hosted in asymmetric garnet frameworks toward high energy batteries", Energy Storage Materials, 14, (2018), 376-382.

Wang, Chengwei, et al., "A general method to synthesize and sinter bulk ceramics in seconds", Science, 368, (2020), 521-526.

Yi, Eongyu, et al., "Flame made nanoparticles permit processing of dense, flexible, Li+ conducting ceramic electrolyte thin films of cubic-Li7La3Zr2O12 (c-LLZO)", J. Mater. Chem. A, 4,12947, (2016), 12947-12954.

* cited by examiner

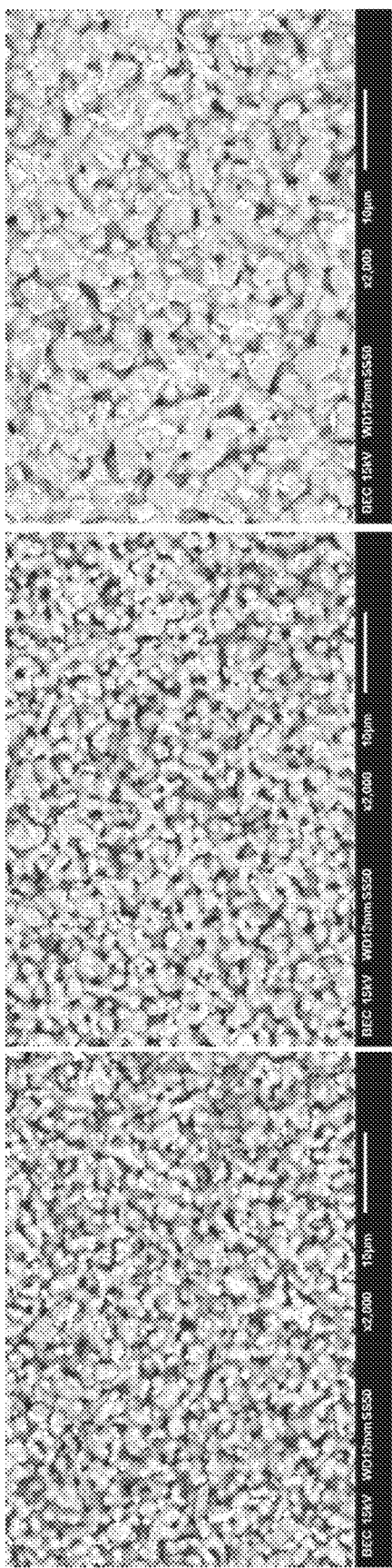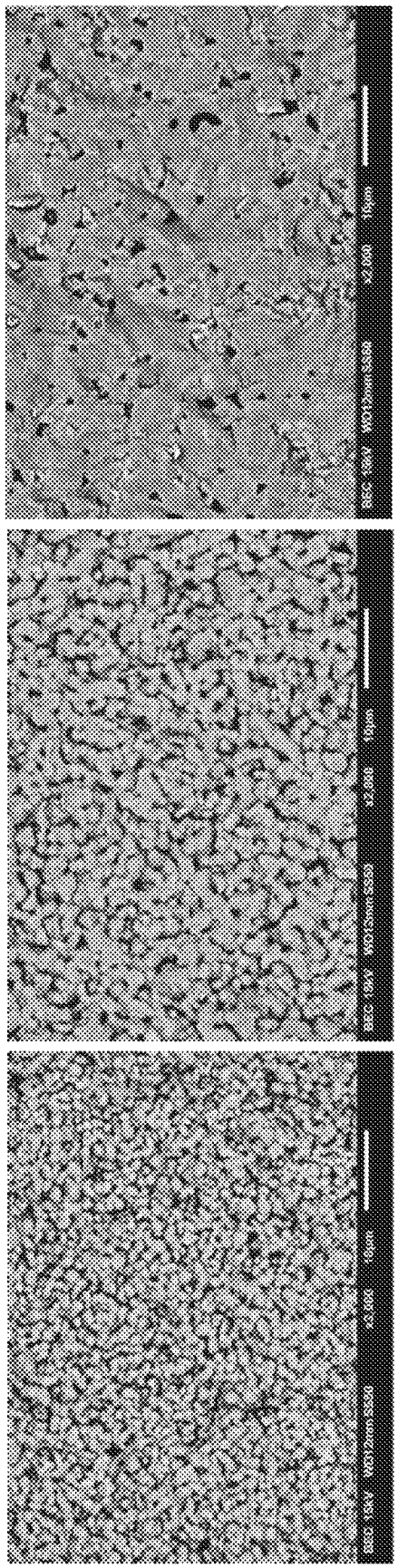
FIG. 14A  FIG. 14B  FIG. 14C  FIG. 14D  FIG. 14E  FIG. 14F

PASSIVATED LLZO PARTICLES AND TAPE CASTING OF LLZO FILMS

BACKGROUND

Li-garnet ($Li_7La_3Zr_2O_{12}$) has become one of the promising candidates for solid electrolyte using in Li-metal-based solid state battery, which provides one of the solutions for high density batteries. Thin garnet is important for realizing the high volumetric energy density. Tape casting is a conventional method for making thin ceramic sheets. However, since pristine garnet is highly reactive to water and $CO_2$ in air, special techniques are needed for tape casting.

SUMMARY OF THE INVENTION

The present invention provides a passivated $Li_7La_3Zr_2O_{12}$ (LLZO) particle. The particle includes an LLZO core. The LLZO is optionally doped with one or more elements. The particle also includes a shell including H-LLZO, $H_3O^+$-LLZO, and/or $Li_2CO_3$.

The present invention provides a tape casting powder including a plurality of the passivated LLZO particles. The tape casting powder can include an excess lithium source such that the tape casting powder has an amount of Li that is 1% to 40% in excess of a stoichiometric amount of Li in the LLZO. The excess lithium source can include $Li_2CO_3$, LiOH, $Li_2O$, LiCl, $LiNO_3$, Li-citrate, Li-acetate, Li-oleate, LiF, $Li_2SO_4$, or combinations thereof.

The present invention provides a slip composition including a plurality of the passivated LLZO particles. The tape casting slip composition can include an excess lithium source such that the tape casting powder has an amount of Li that is 1% to 40% in excess of a stoichiometric amount of Li in the LLZO. The excess lithium source can include $Li_2CO_3$, LiOH, $Li_2O$, LiCl, $LiNO_3$, Li-citrate, Li-acetate, Li-oleate, LiF, $Li_2SO_4$, or combinations thereof.

The present invention provides a green tape formed by tape casting. The green tape includes the passivated particles, the tape casting powder, the tape casting slip composition, or a combination thereof.

The present invention provides a method of forming the passivated particle. The method includes heating LLZO in air and/or $CO_2$ at 50° C. to 650° C. for a suitable duration to form the passivated particle, wherein the LLZO is optionally doped with one or more elements.

The present invention provides a method of tape casting. The method includes tape casting the tape casting powder or the tape casting slip composition to form a green tape or dried product thereof.

The present invention provides a method of tape casting. The method includes tape casting a tape casting slip composition to form a green tape or dried product thereof. The tape casting slip composition includes a plurality of passivated $Li_7La_3Zr_2O_{12}$ (LLZO) particles. The particles include an LLZO core, wherein the LLZO is optionally doped with one or more elements. The particles also include a shell including H-LLZO, $H_3O^+$-LLZO, and/or $Li_2CO_3$.

The present invention provides a method of tape casting. The method includes tape casting a tape casting slip composition to form a green tape. The tape casting slip composition includes a plurality of passivated $Li_7La_3Zr_2O_{12}$ (LLZO) particles. The particles include an LLZO core, wherein the LLZO is optionally doped with one or more elements. The particles also include a shell including H-LLZO, $H_3O^+$-LLZO, and/or $Li_2CO_3$. The tape casting slip composition includes an excess lithium source in sufficient quantity such that the tape casting slip composition includes an amount of Li that is 1% to 40% in excess based on a stoichiometric amount of Li in the LLZO core. The excess lithium source includes $Li_2CO_3$, LiOH, $Li_2O$, LiCl, $LiNO_3$, Li-citrate, Li-acetate, Li-oleate, LiF, $Li_2SO_4$, or combinations thereof. The method includes drying the green tape. The method also includes sintering the green tape in the absence of a mother powder. The sintering can include any suitable sintering.

The present invention provides a cast LLZO film formed by the method of tape casting.

The present invention provides a lithium battery including the cast LLZO film.

Various aspects of the present invention have certain advantages over other materials used for forming tape cast films, methods of tape casting, and cast films formed therewith. Thin garnet has usually been made by pressing the garnet powder followed by co-sintering with a mother powder. Hot press sintering is also used to make high density sintered samples. These two methods make samples that need to be sliced and/or polished to thin film. The thickness is usually greater than 150 microns. These processes are batch processes, need long firing cycles, take many finishing steps, and are hard to scale up in both sample size and quantity. The present disclosure describes passivated LLZO particles and methods of making the same, wherein the passivated particles include an inert passivated layer. This passivated layer can be formed by carbonation of the garnet powder. The passivated particles can stabilize the garnet to prevent it from reacting with organic materials in tape casting slips or in green tapes, so that the tapes can have long shelf life. Without such treatment, green tape becomes fragile within one week, or the garnet powder can react with the organic materials in the slip. An excess lithium source can be added in the tape casting powder or tape casting slip composition to allow the tape to have excess Li in situ for compensating the Li-loss during tape sintering.

For example, in various aspects, tape casting compositions (powders, slip compositions) including the passivated particles of the present invention can be inert or less reactive with organic material in tape casting slips and green tapes, and can be inert or less reactive with air. As a result, the passivated particles, tape casting powders, tape casting slip compositions, and green tapes of the present invention can be more stable (e.g., can remain less brittle over longer times) and have a longer shelf life than non-passivated garnet particles, tape casting powders or slip compositions including the same, or green tapes formed therefrom. In various aspects, tape casting of the passivated particles, tape casting powders, and tape casting slip compositions of the present invention, including the sintering of the green tape, can be performed in air and need not be performed in an inert atmosphere.

In various aspects, the method of forming the passivated particles of the present invention can be easier and have lower cost than other methods of forming LLZO particles, such as compared to a flame spray process which uses expensive metalorganic precursors, large amounts of solvent, and having lower collection efficiency. In various aspects, the method of forming the passivated particles of the present invention can be performed without special protective equipment (e.g., PPE equipment) as is required for nano-powder handling.

In various aspects, the excess Li present in various tape casting powders and slip compositions of the present invention provide a simple solution to compensate for loss of Li during sintering, which other methods accomplish with use of a mother powder. In various aspects, excess Li (e.g., in the form of $Li_2CO_3$, LiOH, $Li_2O$, LiCl, $LiNO_3$, Li-citrate, Li-acetate, Li-oleate, LiF, $Li_2SO_4$, or combinations thereof) in tape casting powders and slip compositions of the present invention can provide a liquid phase to enhance the garnet sintering at lower temperature, and can at least partially also prevent grain growth during sintering, allowing the method to provide sintered tapes having a denser and finer-grained microstructure, as compared to sintered tapes formed from other types of LLZO garnet particles or compositions including the same.

In various aspects, the fast firing process used in the method of forming a sintered film from tape cast powders and slip compositions including the passivated particles can be a low-cost and simple sintering process which can also provide advantages in the microstructure of the resulting sintered film.

In various aspects, the method of forming the passivated particles of the present invention can provide a stable density from batch to batch, which can help to provide the same amount of excess Li in green tapes formed therewith from batch to batch. The amount of excess lithium can have an impact on tape sintering temperature, grain growth, and/or density; therefore, the consistent density can allow production of a more consistent tape cast sintered film.

BRIEF DESCRIPTION OF THE FIGURES

The drawings illustrate generally, by way of example, but not by way of limitation, various aspects of the present invention.

FIGS. 14A-C illustrate SEM images of fractured surfaces of sintered green tapes formed from passivated garnet formed at 600° C. with $CO_2$, at 1200° C. for 3 min, 1250° C. for 3 min, and 1300° C. for 3 min, respectively.

FIGS. 14D-F illustrate SEM images of fractured surfaces of sintered green tapes formed from passivated garnet that was air passivated, at 1200° C. for 3 min, 1250° C. for 3 min, and 1300° C. for 3 min, respectively.

DETAILED DESCRIPTION OF THE INVENTION

Figure 1:
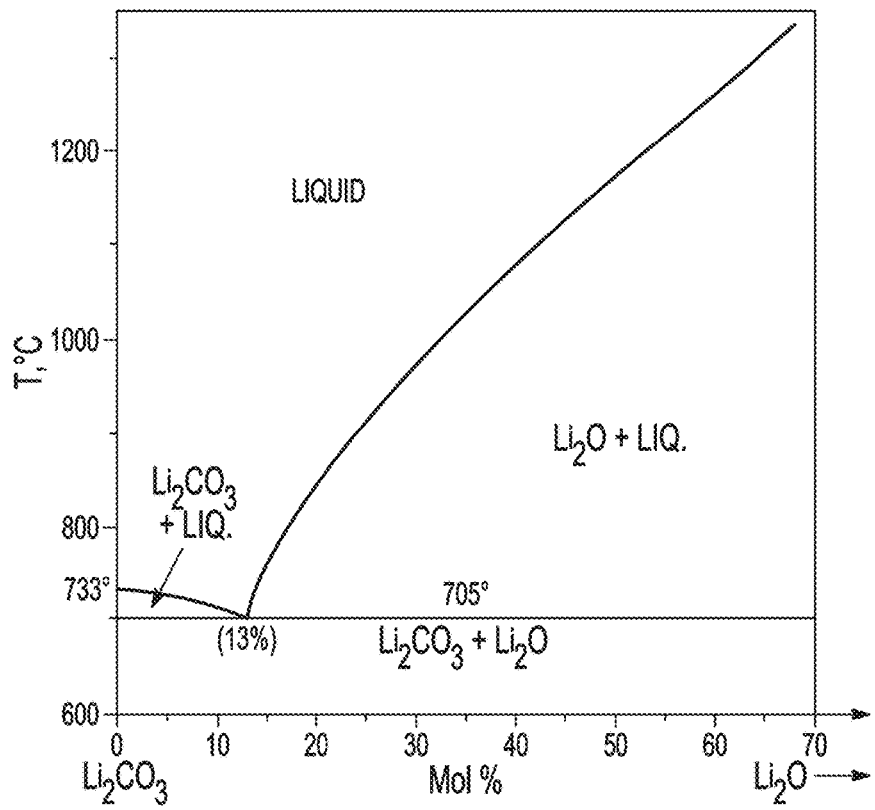
FIG. 1 illustrates a phase diagram of $Li_2CO_3$—$Li_2O$.

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" or "at least one of A or B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%. The term "substantially free of" as used herein can mean having none or having a trivial amount of, such that the amount of material present does not affect the material properties of the composition including the material, such that about 0 wt % to about 5 wt % of the composition is the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less, or about 0 wt %.

As used herein, the term "polymer" refers to a molecule having at least one repeating unit and can include copolymers.

As used herein, the terms "LLZO," "garnet," or like terms refer to compounds including lithium (Li), lanthanum (La), zirconium (Zr), and oxygen (O) elements. Optionally, dopant elements may substitute at least one of Li, La, or Zr. For example, lithium-garnet electrolyte comprises at least one of: (i) $Li_{7-3a}La_3Zr_2L_aO_{12}$, with L=Al, Ga or Fe and $0<a<0.33$; (ii) $Li_7La_{3-b}Zr_2M_bO_{12}$, with M=Bi, Ca, or Y and $0<b<1$; (iii) $Li_{7-c}La_3(Zr_{2-c}, N_c)O_{12}$, with N=In, Si, Ge, Sn, V, W, Te, Nb, or Ta and $0<c<1$; (iv) $Li_{7-x}La_3(Zr_{2-x}, M_x)O_{12}$, with M=In, Si, Ge, Sn, Sb, Sc, Ti, Hf, V, W, Te, Nb, Ta, Al, Ga, Fe, Bi, Y, Mg, Ca, or combinations thereof and $0<x<1$, or a combination thereof.

Passivated LLZO Particle.

Various aspects of the present invention provide a passivated $Li_7La_3Zr_2O_{12}$ (LLZO) particle. The LLZO can optionally be doped with one or more elements, such that the LLZO includes one or more elements that replace or supplement one or more of Li, La, Zr, or O in the base formula $Li_7La_3Zr_2O_{12}$. The passivated particle includes an LLZO core that is the LLZO that is undoped or doped. The passivated particle includes a shell around the core. The shell includes H-LLZO, $H_3O^+$-LLZO, and/or $Li_2CO_3$.

The passivated LLZO particle can have any suitable diameter. For example, the diameter (e.g., D50) can be 0.1 micron to 5 microns, 0.3 microns to 0.9 microns, or less than or equal to 5 microns but greater than or equal to 0.1 micron, 0.2, 0.3, 0.4, 0.5, 0.6, 0.7, 0.8, 0.9, 1, 1.2, 1.4, 1.6, 1.8, 2, 2.2, 2.4, 2.6, 2.8, 3, 3.2, 3.4, 3.6, 3.8, 4, 4.2, 4.4, 4.6, or 4.8 microns.

In some aspects, the LLZO in the core is undoped and has the formula $Li_7La_3Zr_2O_{12}$. In other aspects, $Li_7La_3Zr_2O_{12}$ is the base formula and one or more of Li, La, Zr, or O is replaced or supplemented with one or more doped elements, such as Al, Ga, Ta, Nb, W, Ca, or a combination thereof. The LLZO can be doped with Ta. The LLZO doped with Ta can have the formula $Li_{6.7-6.3}La_3Zr_{1.7-1.3}Ta_{0.3-0.7}O_{12}$, or $Li_{6.5}La_3Zr_{1.5}Ta_{0.5}O_{12}$.

The LLZO core can form any suitable proportion of the passivated LLZO particle, such as 20 wt % to 99.99 wt % of the particle, 80 wt % to 99.99 wt % of the particle, or less than or equal to 99.99 wt % but greater than or equal to 20 wt %, 25, 30, 35, 40, 45, 50, 55, 60, 65, 70, 75, 80, 81, 82, 83, 84, 85, 86, 87, 88, 89, 90, 91, 92, 93, 94, 95, 96, 97, 98, 99, 99.5, or 99.9 wt %.

In various aspects, the core and the shell can directly contact one another, with the shell surrounding the core. In other aspects, one or more intervening layers (e.g., intervening shells) can occur between the shell and the core. For example, the passivated LLZO particle can include an H-LLZO and/or $H_3O^+$-LLZO layer (e.g., intervening shell) between the core and an $Li_2CO_3$-containing shell. The H-LLZO and/or $H_3O^+$-LLZO layer can be a continuous layer or a discontinuous layer. The intervening shell can have any suitable thickness, such as a thickness of 1 nm to 2.5 microns, 1 nm to 50 nm, or 10 nm to 40 nm, or less than or equal to 50 nm but greater than or equal to 1 nm, 2, 3, 4, 5, 6, 8, 10, 12, 14, 16, 18, 20, 22, 24, 26, 28, 30, 32, 34, 36, 38, 40, 42, 44, 46, 48, 50, 75, 100, 150, 200, 250, 500, 750, 1000, 1250, 1500, 1750, 2000, or 2250 nm. In various aspects, the shell is an H-LLZO and/or $H_3O^+$-LLZO shell. In various aspects, the shell is an $Li_2CO_3$-containing shell, and the particle includes an intervening shell that includes H-LLZO and/or $H_3O^+$-LLZO.

The shell around the core can be any suitable shell that can be formed using the method of forming the passivated LLZO particles described herein. For example, the shell can include $Li_2CO_3$, $La_2Zr_2O_7$, $La_2O_3$, H-LLZO, $H_3O^+$-LLZO, or a combination thereof. In some aspects, $Li_2CO_3$ formed on the particle can be removed to form a particle including an LLZO core and a shell including H-LLZO, $H_3O^+$-LLZO, or a combination thereof. The shell can be predominantly (e.g., greater than 50 wt %) $Li_2CO_3$, or can be predominantly H-LLZO, or predominantly $H_3O^+$-LLZO. The shell can form any suitable proportion of the particle. For example, the shell can be 0.01 wt % to 80 wt % of the particle, 0.01 wt % to 20 wt % of the particle, or less than or equal to 80 wt % but greater than or equal to 0.01 wt %, 0.05, 0.1, 0.2, 0.4, 0.5, 0.6, 0.8, 1, 1.5, 2, 3, 4, 5, 6, 8, 10, 15, 20, 25, 30, 35, 40, 45, 50, 55, 60, 65, 70, or 75 wt %. The shell can have any suitable thickness, such as a thickness of 1 nm to 2.5 microns, 1 nm to 50 nm, or 10 nm to 40 nm, or less than or equal to 50 nm but greater than or equal to 1 nm, 2, 3, 4, 5, 6, 8, 10, 12, 14, 16, 18, 20, 22, 24, 26, 28, 30, 32, 34, 36, 38, 40, 42, 44, 46, 48, 50, 75, 100, 150, 200, 250, 500, 750, 1000, 1250, 1500, 1750, 2000, or 2250 nm. The shell is formed from passivation of the LLZO following the method of forming the passivated particles described herein. The shell is formed from passivation products of the LLZO core material when the LLZO core material is subjected to the conditions described herein, which transforms portions of the LLZO core material into the shell. The total amount of Li present in the passivated LLZO particle (e.g., in the LLZO core, the shell, and in any intervening H-LLZO and/or $H_3O^+$-LLZO layers) is equal to a stoichiometric amount of Li in the LLZO.

The passivated LLZO particle can be formed via any suitable technique, such as the method for forming passivated LLZO particles described herein. The passivated LLZO particle can be formed via air carbonation. For example, an as-made garnet powder can be exposed to air at elevated temperature (e.g., 50° C.) for a sufficient duration (e.g., 1 month). The powder reacts with $H_2O$ and $CO_2$ in air to form H-LLZO and/or $H_3O^+$-LLZO (intervening shell) on an LLZO core, with an overlaying $Li_2CO_3$ outer shell on the garnet powder particles. In another aspect, the passivated LLZO particles can be formed via acid treatment. For example, acid (e.g., HCl, HF, $HNO_3$, $H_3PO_4$, $H_2SO_4$, acetic acid, boric acid, carbonic acid, citric acid, oxalic acid, and the like) can be added to a slurry as-made garnet powder. Initially, pH of the slurry can exceed 7, but this value can gradually decrease by addition of the acid until settling to a desired pH of around 6. Centrifuging the slurry can separate the final powder. The obtained powder can include an H-LLZO and/or $H_3O^+$-LLZO shell and an LLZO core with no outer $Li_2CO_3$ shell formation.

Tape Casting Powder, Tape Casting Slip Composition, and Green Tape.

In various aspects the present invention provides a tape casting powder or tape casting slip composition that includes the passivated LLZO particles of the present invention. In various aspects, the present invention provides a green tape or dried product thereof that is formed by tape casting of a composition including the passivated particles of the present invention or from the tape casting powder or tape casting slip composition of the present invention.

The tape casting powder of the present invention can include a plurality of the passivated LLZO particles. The tape casting powder can further include sufficient excess lithium source (i.e., added excess lithium source that is in addition to lithium such as $Li_2CO_3$ that may be present in the shell of the passivated particles) such that the tape casting powder has a total amount of Li that is 1% to 40% in excess of a stoichiometric amount of Li in the LLZO. The excess lithium source can include $Li_2CO_3$, LiOH, $Li_2O$, LiCl, $LiNO_3$, Li-citrate, Li-acetate, Li-oleate, LiF, $Li_2SO_4$, or combinations thereof.

The tape casting slip composition of the present invention can include a plurality of the passivated LLZO particles. The tape casting slip composition can further include sufficient excess lithium source (i.e., added excess lithium source that is in addition to lithium such as $Li_2CO_3$ that may be present in the shell of the passivated particles) such that the tape casting slip composition has a total amount of Li that is 1% to 40% in excess of a stoichiometric amount of Li in the LLZO. The excess lithium source can include $Li_2CO_3$, LiOH, $Li_2O$, LiCl, $LiNO_3$, Li-citrate, Li-acetate, Li-oleate, LiF, $Li_2SO_4$, or combinations thereof.

$Li_2CO_3$ melts at 723° C., followed by its decomposition into $Li_2O$ and $CO_2$. $Li_2CO_3$'s melting can provide a liquid phase to enhance garnet sintering. With more $Li_2CO_3$ in the powder system, the liquid phase can last to higher temperature during calcination. With faster temperature ramping rate, $Li_2CO_3$ can also be kept in liquid phase to higher temperatures. FIG. 1 shows the phase diagram of $Li_2CO_3$—$Li_2O$ co-existing system. These liquid phases can significantly enhance the garnet sintering during the method of tape casting.

Any suitable proportion of the tape casting slip composition can be the passivated LLZO particles. For example, the passivated LLZO particles can be 1-100 wt % of the tape casting slip composition, or 30 wt % to 60 wt %, or less than or equal to 100 wt % but greater than or equal to 1 wt %, 2, 4, 6, 8, 10, 15, 20, 25, 30, 35, 40, 45, 50, 55, 60, 65, 70, 75, 80, 85, 90, or 95 wt % of the tape casting slip composition.

The tape casting slip composition can further include any suitable one or more components, such as excess lithium source (i.e., added excess lithium source that is in addition to lithium such as $Li_2CO_3$ that may be present in the shell of the passivated particles), a dispersant, a plasticizer, a solvent, a binder, or a combination thereof.

The tape casting slip composition can include an excess lithium source, wherein the excess lithium source is 1 wt % to 10 wt % of the tape casting slip composition, or 1 wt % to 5 wt % of the tape casting slip composition, or less than or equal to 10 wt % but greater than or equal to 1 wt %, 1.5, 2, 2.5, 3, 3.5, 4, 4.5, 5, 5.5, 6, 6.5, 7, 7.5, 8, 8.5, 9, or 9.5 wt %. The tape casting slip composition can include a sufficient amount of excess lithium source in addition to any $Li_2CO_3$ present in the particles such that the total amount of Li in the tape casting slip composition is 1% to 40% in excess of a stoichiometric amount of Li in the LLZO. The excess lithium source can include $Li_2CO_3$, LiOH, $Li_2O$, LiCl, $LiNO_3$, Li-citrate, Li-acetate, Li-oleate, LiF, $Li_2SO_4$, or combinations thereof.

The tape casting slip composition can include a dispersant. The dispersant can be any suitable dispersant. The dispersant can be a water-soluble linear polymer that includes one or more polar groups thereon. The dispersant can include Disperbyk® 118, Disperbyk® 142, Disperbyk® 182, Disperbyk® 2022, Disperbyk® 2155, Solsperse™ 41090, Anti-Terra® 250, fish oil, or combinations thereof. The dispersant can form any suitable proportion of the tape casting composition. For example, the dispersant can be 0.1 wt %-10 wt % of the tape casting slip composition, 0.5 wt % to 5 wt %, or less than or equal to 10 wt % and greater than or equal to 0.1 wt %, 0.5, 1, 2, 3, 4, 5, 6, 7, 8, or 9 wt % of the tape casting slip composition.

The tape casting slip composition can include a plasticizer. The plasticizer can be any suitable plasticizer. The plasticizer can include n-butyl stearate, Polymer Innovations® PL029, dibutyl phthalate (DBP), propylene glycol (PG), or a combination thereof. The plasticizer can form any suitable proportion of the tape casting slip composition, such as 0.1 wt %-10 wt % of the tape casting slip composition, 0.5 wt % to 5 wt %, or less than or equal to 10 wt % and greater than or equal to 0.1 wt %, 0.5, 1, 2, 3, 4, 5, 6, 7, 8, or 9 wt % of the tape casting slip composition.

The tape casting slip composition can include a solvent, such as an organic solvent. The solvent can include n-propyl propionate. The solvent can form any suitable proportion of the tape casting slip composition. For example, the solvent can be 10 wt % to 80 wt % of the tape casting slip composition, 30 wt % to 50 wt %, or less than or equal to 80 wt % and greater than or equal to 10 wt %, 15, 20, 25, 30, 35, 40, 45, 50, 55, 60, 65, 70, or 75 wt % of the tape casting slip composition.

The tape casting slip composition can include a binder. The binder can be any suitable binder. The binder can include an iso-butyl/n-butyl methacrylate copolymer. The binder can include a polyvinyl butyral-based binder or an acrylic binder. In one aspect, the at least one binder comprises at least one of Elvacite® 2046, Elvacite® 4044, Butvar® B-79, or combinations thereof. The binder can form any suitable proportion of the tape casting slip composition. For example, the binder can be 1 wt % to 20 wt % of the tape casting slip composition, or 5 wt % to 15 wt %, or less than or equal to 20 wt % and greater than or equal to 1 wt %, 2, 4, 6, 8, 10, 12, 14, 16, 18, or 19 wt % of the tape casting slip composition.

The green tape or dried product thereof formed by tape casting of a composition including the passivated particles of the present invention or from the tape casting powder or tape casting slip composition of the present invention can retain flexibility for at least 1 month (e.g., at least 1 month, 2 months, 3, 4, 5, 6, 7, 8, 10 months, 1 year, 1.5, 2, 3, 4, or 5 years or more) after the formation of the green tape or dried product thereof.

The green tape or dried product thereof can have any suitable thickness, such as a thickness of 25 microns to 150 microns, 40 microns to 130 microns, or less than or equal to 150 microns but greater than or equal to 25 microns, 30, 35, 40, 45, 50, 55, 60, 65, 70, 75, 80, 85, 90, 95, 100, 105, 110, 115, 120, 125, 130, 135, 140, or 145 microns.\

Method of Forming a Passivated Particle.

Various aspects of the present invention provide a method of forming the passivated LLZO particle described herein. The method can include heating LLZO for a suitable duration and at a suitable temperature to form the passivated particle. The heating can include heating in any suitable medium, such as air (e.g., moist air that includes $H_2O$, air that includes $CO_2$, or moist air that includes $H_2O$ and $CO_2$) or $CO_2$. The LLZO that is heated has the same composition as the LLZO core of the passivated particle. The LLZO that is heated can be undoped and has the formula $Li_7La_3Zr_2O_{12}$. In other aspects, $Li_7La_3Zr_2O_{12}$ is the base formula of the LLZO that is heated and one or more of Li, La, Zr, or O is replaced or supplemented with one or more doped elements, such as Al, Ga, Ta, Nb, W, Ca, or a combination thereof. The LLZO can be doped with Ta. The LLZO doped with Ta can have the formula $Li_{6.7-6.3}La_3Zr_{1.7-1.3}Ta_{0.3-0.7}O_{12}$, or $Li_{6.5}La_3Zr_{1.5}Ta_{0.5}O_{12}$.

The LLZO that is heated to form the passivated LLZO particle can have any suitable particle size (e.g., D50), such as 0.1 micron to 5 microns, 0.3 microns to 0.9 microns, or less than or equal to 5 microns but greater than or equal to 0.1 micron, 0.2, 0.3, 0.4, 0.5, 0.6, 0.7, 0.8, 0.9, 1, 1.2, 1.4, 1.6, 1.8, 2, 2.2, 2.4, 2.6, 2.8, 3, 3.2, 3.4, 3.6, 3.8, 4, 4.2, 4.4, 4.6, or 4.8 microns. The LLZO can be a milled LLZO. The LLZO can be a jet milled LLZO.

The heating can be performed for any suitable duration such that the passivated LLZO particle described herein is formed. The heating can include heating for 0.5 hours to 1 month, or 0.5 hours to 1 week, or less than or equal to 1 week but greater than or equal to 0.5 h, 1, 2, 3, 4, 5, 6, 8, 10, 12, 14, 16, 18, 20, 22 h, 1 d, 1.5, 2, 3, 4, 5, 6, 8, 10, 12, 14, 16, 18, 20, 22, 24, 26, 28, or 30 days. The heating can be performed at any suitable temperature such that the LLZO particle described herein is formed, such as at room temperature to 650° C., 50° C. to 650° C., room temperature to 300° C., 50° C. to 300° C., 500° C. to 650° C., or less than or equal to 650° C. but greater than or equal to room temperature, 30° C., 40° C., 50° C., 60, 70, 80, 90, 100, 110, 120, 130, 140, 150, 160, 170, 180, 190, 200, 210, 220, 230, 240, 250, 260, 270, 280, 290, 300, 320, 340, 360, 380, 400, 420, 440, 460, 480, 500, 510, 520, 530, 540, 550, 560, 570, 580, 590, 600, 610, 620, 630, or 640° C. The heating can include heating in inert air or $CO_2$.

The heating can include heating in air at room temperature to 300° C. for 24 hours to 30 days, or for at least 48 hours. The heating in air can form a passivated LLZO particle having an LLZO core that is greater than or equal to 80 wt % of the passivated particle.

The heating can include heating in $CO_2$ at 500° C. to 650° C. for 0.5 to 10 hours, or for 1 to 5 hours. The heating in $CO_2$ can form a passivated LLZO particle having an LLZO core than is greater than or equal to 20 wt % of the passivated particle.

Method of Tape Casting.

In various aspects, the present invention provides a method of tape casting. The method includes tape casting a composition including the passivated LLZO particles of the present invention, such as tape casting the tape casting powder or the tape casting slip composition of the present invention, to form a green tape or dried product thereof.

The method can include tape casting the tape casting slip composition or tape casting powder to form a green tape or dried product thereof. The tape casting slip composition can include a plurality of passivated $Li_7La_3Zr_2O_{12}$ (LLZO) particles. The passivated particles include an LLZO core, wherein the LLZO is optionally doped with one or more elements. The passivated particles include a shell including H-LLZO, $H_3O^+$-LLZO, and/or $Li_2CO_3$.

The green tape and/or dried product thereof can have any suitable thickness, such as a thickness of 25 microns to 150 microns, 40 microns to 130 microns, or less than or equal to 150 microns but greater than or equal to 25 microns, 30, 35, 40, 45, 50, 55, 60, 65, 70, 75, 80, 85, 90, 95, 100, 105, 110, 115, 120, 125, 130, 135, 140, or 145 microns.

The method can further include sintering the green tape to form a tape cast LLZO film. The sintering can be any suitable sintering. The sintering can include fast firing or conventional sintering. The fast firing can be performed in air or in inert gas. The sintering can be fast firing in air. In various aspects, the fast firing sintering can be performed for no longer than 20 minutes (e.g., no longer than 20 minutes, 19, 18, 17, 16, 15, 14, 13, 12, 11, 10, 9, 8, 7, 6, 5, 4, 3, 2, or 1 minute). The method can be free of additional heating after the sintering.

The sintering can include heating to 1000° C. to 1400° C. (e.g., 1100° C. to 1300° C., 1150° C. to 1250° C., or less than or equal to 1400° C. but greater than or equal to 1000° C., 1020, 1040, 1060, 1080, 1100, 1120, 1140, 1160, 1180, 1200, 1220, 1240, 1250, 1260, 1280, 1300, 1320, 1340, 1360, or 1380° C.) for any suitable duration (e.g., 0.5 min to 7 days, or 0.5 min to 30 min, or less than or equal to 7 days but greater than or equal to 0.5 min, 1, 2, 4, 6, 8, 10, 15, 20, 25, 30, 35, 40, 45, 50, 55 minutes, 1 h, 1.5, 2, 4, 6, 8, 10, 12, 14, 16, 18, 20, 22 h, 1 d, 1.5, 2, 3, 4, 5, or 6 d) using any suitable temperature ramp up (e.g., 100° C./min to 1000° C./min, 200° C./min to 600° C./min, or less than or equal to 1000° C./min but greater than or equal to 100° C./min, 150, 200, 250, 300, 350, 400, 450, 500, 550, 600, 650, 700, 750, 800, 850, 900, or 950° C./min). In some aspects, the sintering includes heating to 1000° C. to 1400° C. using a temperature ramp up of 100° C./min to 1000° C./min for 0.5 min to 7 days. The sintering can include heating to 1000° C. to 1400° C. using a temperature ramp up of 100° C./min to 1000° C./min for 0.5 min to 30 min. The sintering can include heating to 1100° C. to 1300° C. using a temperature ramp up of 100° C./min to 1000° C./min for 1 min to 20 min. The sintering can be performed in the absence of method powder. The method can include forming the LLZO film within using hot pressing.

In various aspects, the method further includes performing a binder burnout prior to the sintering. The binder burnout can be any suitable procedure that removes the binder from the green tape. For example, the binder burnout can include heating the green tape in an inert gas or in air to a temperature of 400 to 800° C. for a sufficient time to substantially remove binder.

The LLZO film that results from the sintering can have any suitable thickness; for example, the LLZO film can have a thickness of 25 microns to 125 microns, 40 microns to 100 microns, or less than or equal to 125 microns but greater than or equal to 25, 30, 35, 40, 45, 50, 55, 60, 65, 70, 75, 80, 85, 90, 95, 100, 105, 110, 115, or 120 microns.

Cast Film.

Various aspects of the present invention provide a cast film formed from the passivated LLZO particles, the tape casting powder, or the tape casting slip composition of the present invention. The cast film can be formed via any suitable method, such as via the method of tape casting of the present invention. The cast film can be any suitable cast film that can be formed from sintering of the passivated LLZO particles, the tape casting powder, or the tape casting slip composition of the present invention, or via the method of the present invention.

The cast film can include any suitable grain size, such as a grain size of 1.5 microns or less, or such as less than or equal to 1.4 microns, 1.3, 1.2, 1.1, 1, 0.9, 0.8, 0.7, 0.6, 0.5, 0.4, 0.3, 0.2, or 0.1 microns, or can be less than or equal to 1.4 microns but greater than or equal to 0.001 microns, 0.01, 0.1, 0.2, 0.3, 0.4, 0.5, 0.6, 0.7, 0.8, 0.9, or 1.0 microns.

The cast film can have any suitable lithium ion conductivity, such as a lithium ion conductivity of $1\times10^{-3}$ S/cm to $1\times10^{-5}$ S/cm at room temperature, or $1\times10^{-4}$ S/cm to $9\times10^{-4}$ S/cm at room temperature, or less than or equal to $1\times10^{-5}$ S/cm at room temperature but greater than or equal to $1\times10^{-3}$ S/cm at room temperature, $2\times10^{-3}$, $4\times10^{-3}$, $6\times10^{-3}$, $8\times10^{-3}$, $1\times10^{-4}$, $2\times10^{-4}$, $4\times10^{-4}$, $6\times10^{-4}$, or $8\times10^{-4}$ S/cm at room temperature.

Lithium Battery.

Various aspects of the present invention provide a lithium battery that includes the cast LLZO film of the present invention. The cast LLZO film can be any suitable component or or portion thereof of the battery. For example, the cast LLZO film can be an electrolyte of a solid-state lithium battery, or can be a component of an electrolyte of a solid-state lithium battery.

EXAMPLES

Various embodiments of the present invention can be better understood by reference to the following Examples which are offered by way of illustration. The present invention is not limited to the Examples given herein.

Part I

Example I-1. Garnet Powder Preparation

Figure 2:
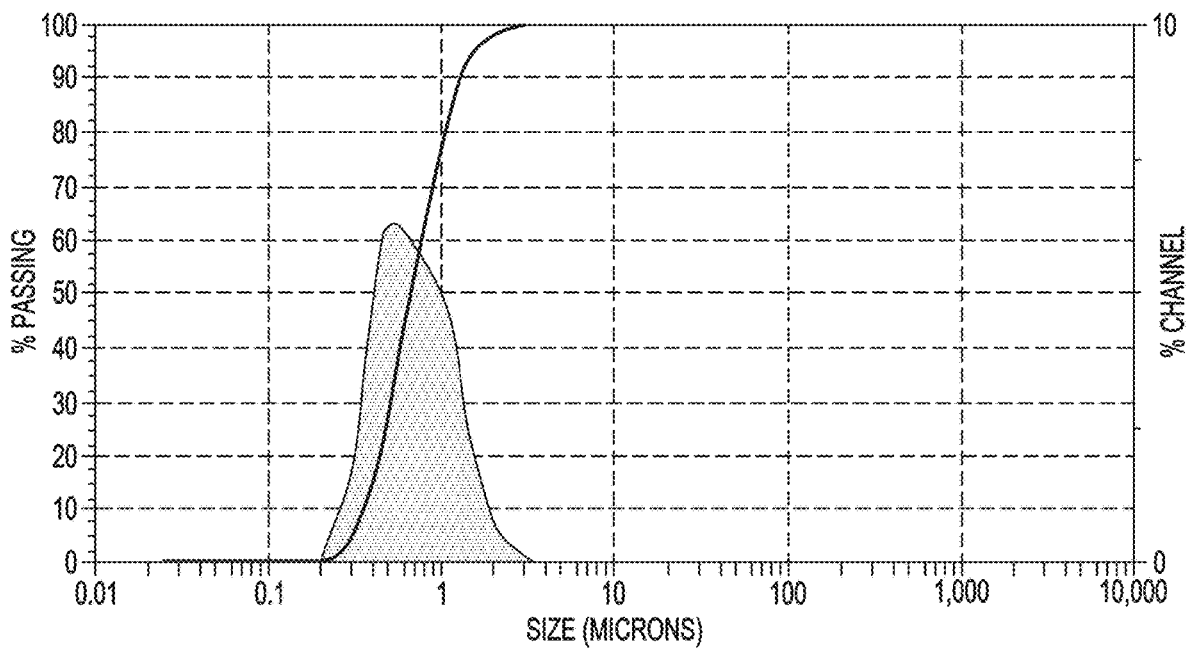
FIG. 2 illustrates the particle size distribution of jet milled Ta:LLZO powder.

Garnet powder was made by solid state reaction method. Using a Ta-doped garnet ($Li_{6.5}La_3Zr_{1.5}Ta_{0.5}O_{12}$) as an example, $Li_2CO_3$, $La_2O_3$, $ZrO_2$, and $Ta_2O_5$ powders in stoichiometry are dry ball mixed. The mixed powder is calcined in a Pt crucible with the following schedule: 25° C.-950° C. at 150° C./hr, 950° C. hold for 5 hrs, 950° C.-1200° C. at 150° C./hr, 1200° C. hold for 4 hrs, and 1200° C.-25 C at 200° C./hr. After calcination, the powder was jet milled, followed by a 100 mesh screening. The obtained particle size was ~0.6 μm at $D_{50}$. FIG. 2 shows the particle size distribution. Table 1 lists the particle size at $D_{10}$-$D_{95}$.

TABLE 1

Particle sizes of garnet powder.

| % Tile | Size (μm) |
|---|---|
| 10 | 0.362 |
| 20 | 0.433 |
| 30 | 0.500 |
| 40 | 0.574 |
| 50 | 0.662 |
| 60 | 0.770 |
| 70 | 0.902 |
| 80 | 1.071 |
| 90 | 1.339 |
| 95 | 1.606 |

Figure 3:
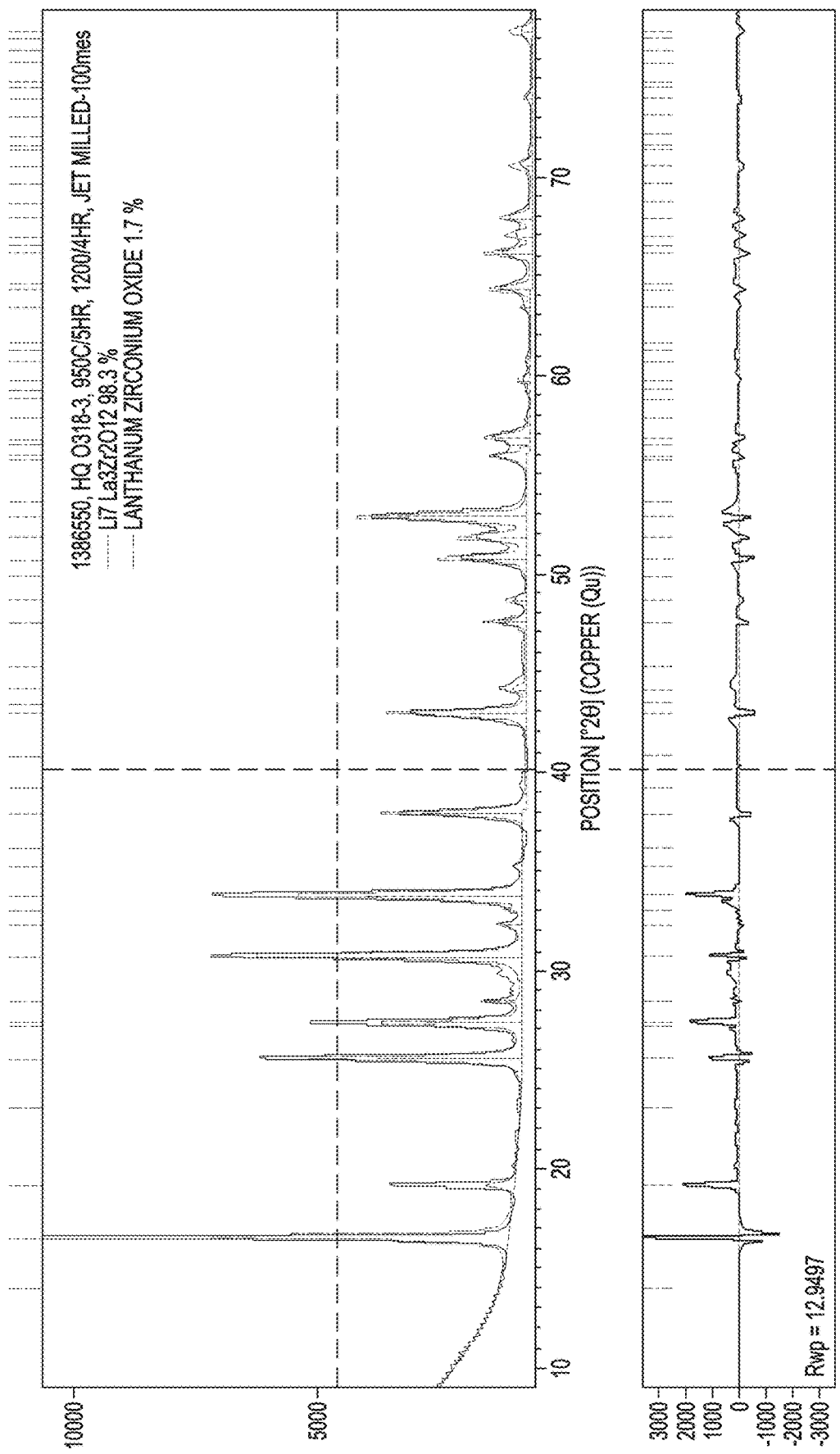
FIG. 3 illustrates an XRD pattern of jet milled Ta:LLZO powder.

FIG. 3 shows an XRD pattern of the jet milled powder. The powder contained 98.3 wt % cubic garnet and 1.7 wt % of $La_2Zr_2O_7$. The $La_2Zr_2O_7$ phase is due to Li loss during the high temperature calcination.

Example I-2. Carbonation of Garnet Powder

Figure 4:
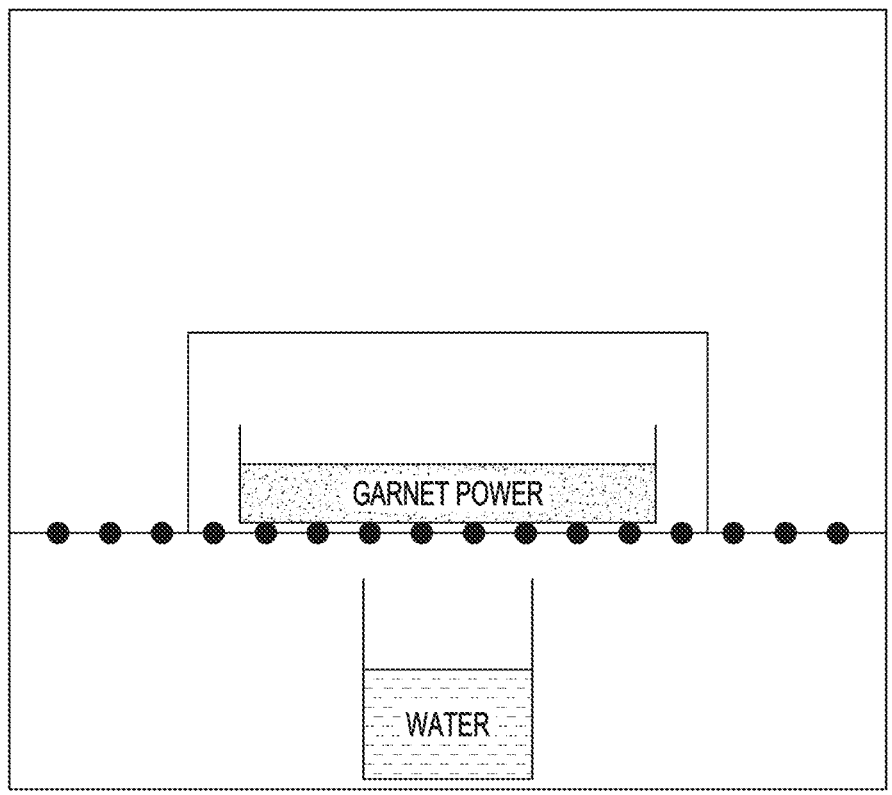
FIG. 4 illustrates an apparatus layout for baking a jet milled Ta:LLZO powder.

The jet milled Ta:LLZO garnet powder was placed in a flat dish in a 50° C. convection oven. The powder dish was covered by a larger cover so that the air could flow into the dish. The powder was baked for more than 3 days. FIG. 4 illustrates the layout of the baking dishes in the oven. The water bath inside oven increased the humidity of the air and enhanced the carbonation process.

Figure 5A:
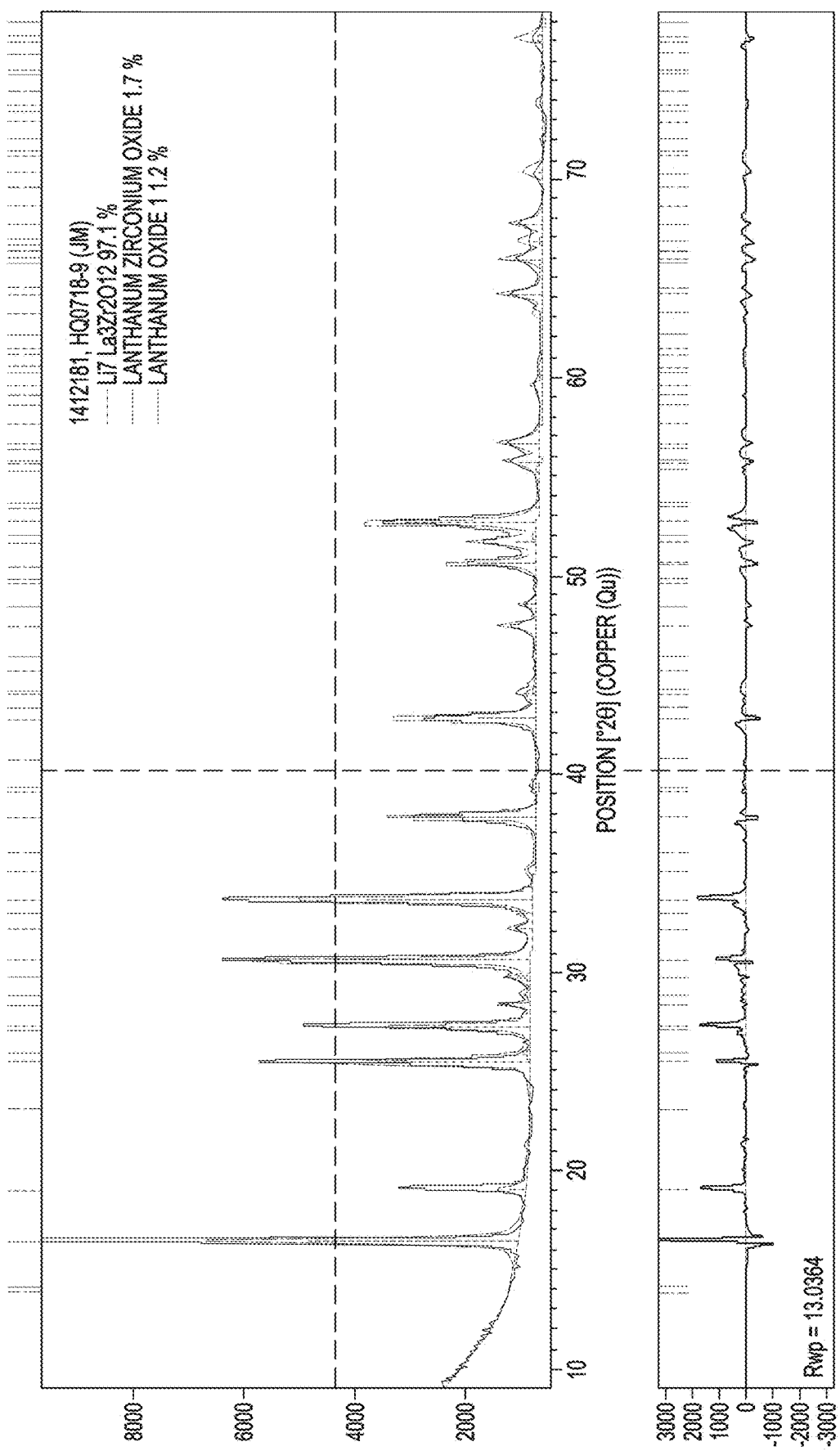
FIG. 5A illustrates an XRD pattern of jet milled Ta:LLZO powder.
Figure 5B:
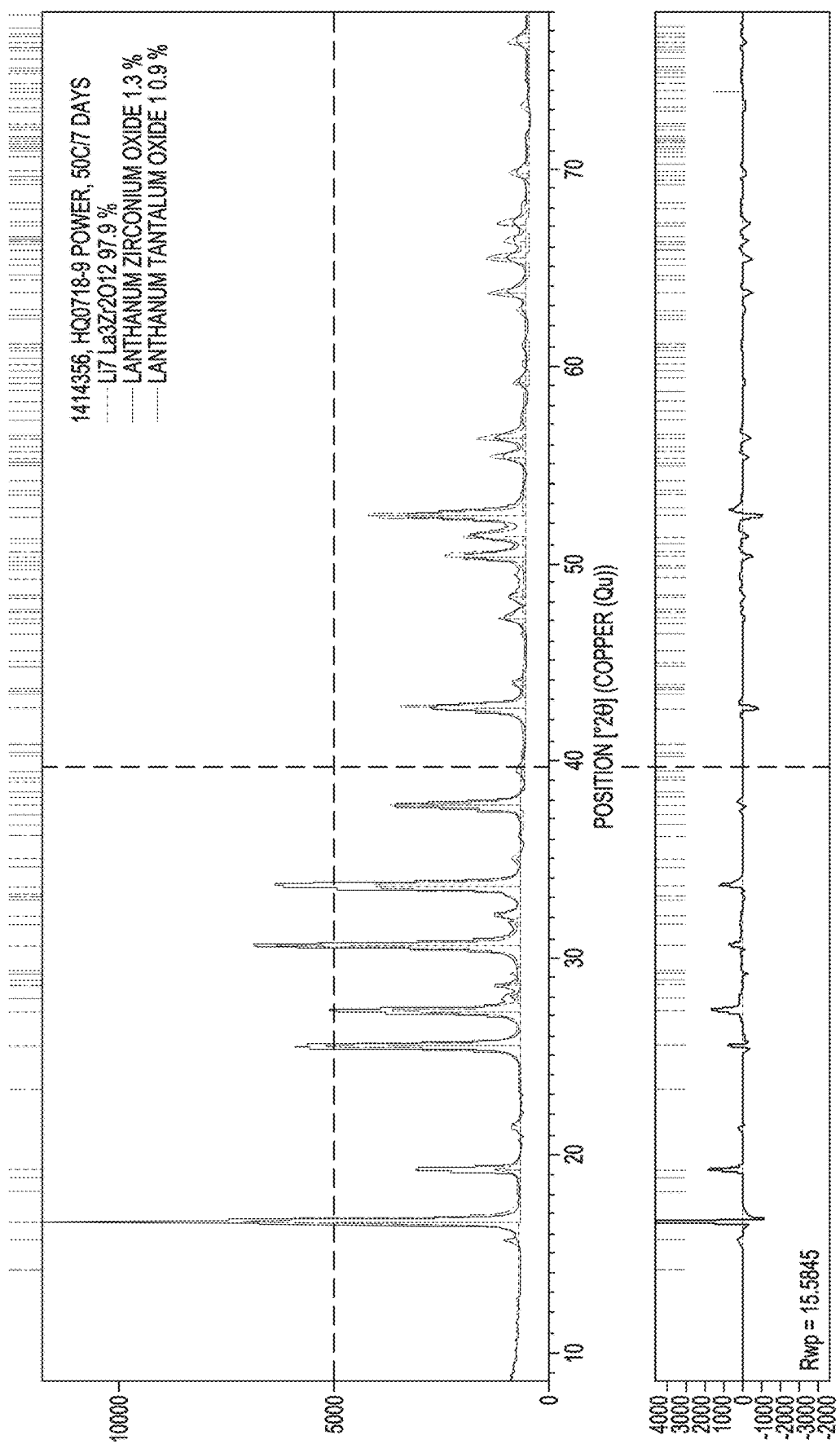
FIG. 5B illustrates an XRD pattern of jet milled Ta:LLZO powder after baking at 50° C. for 7 days.
Figure 5C:
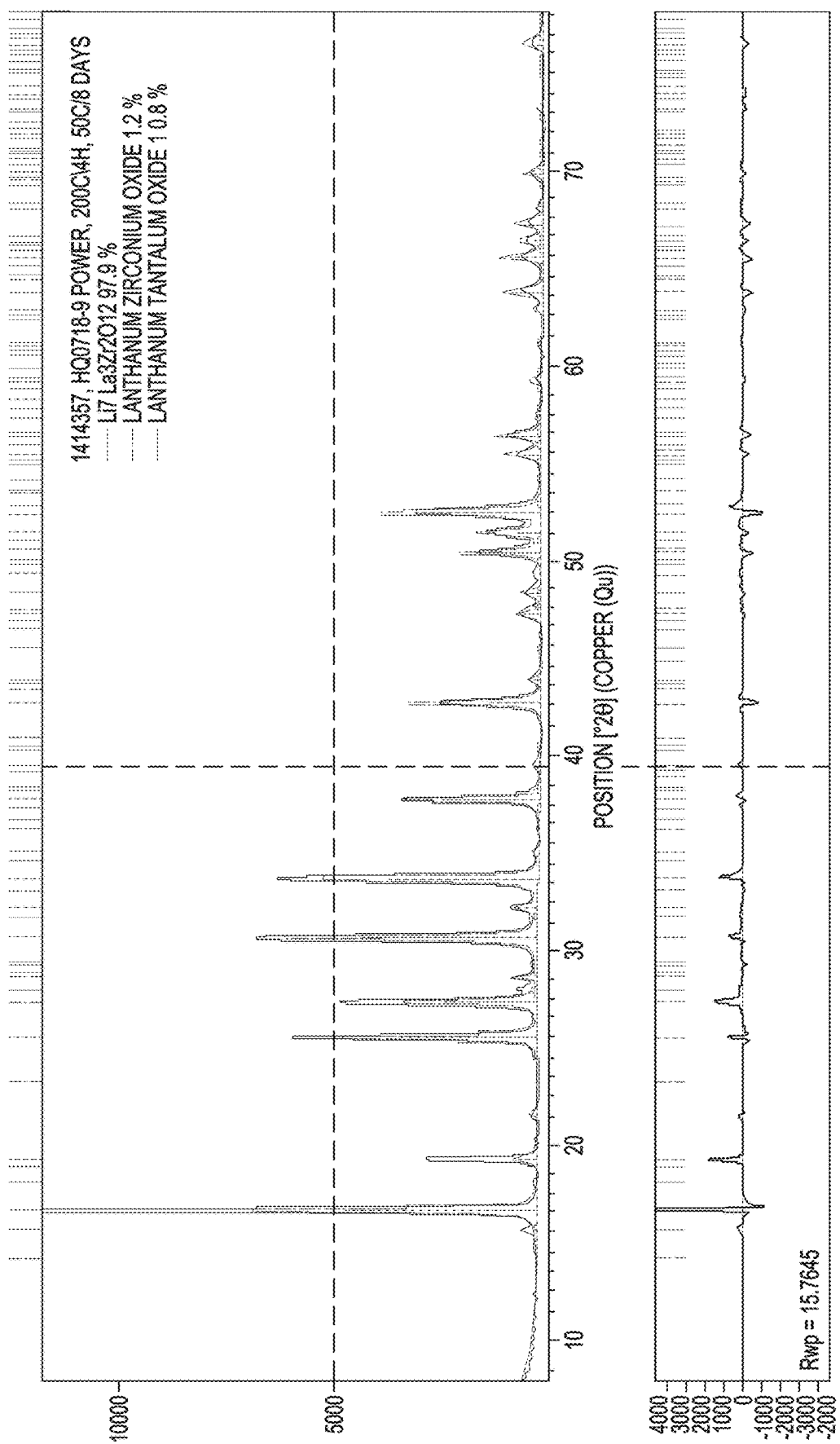
FIG. 5C illustrates an XRD pattern of jet milled Ta:LLZO powder after baking at 200° C. for 4 hours.

FIGS. 5A-C illustrate the XRD pattern of (A) the jet milled powder, (B) the powder after treatment for 7 days at 50° C., and (C) the powder after treatment at 200° C. for 4 hours. Table 2 shows the XRD analysis results of the powder. No significant change was observed for the carbonated powders, indicating the garnet structure was not destructed by this carbonation treatment. H-LLZO also has a cubic garnet structure, with slightly enlarged lattice constant. The XRD measured both H-LLZO (shell) and LLZO (core), and the two sets of peaks were too close to resolve.

TABLE 2

XRD analyis results of Ta:LLZO before and after carbonation treatment.

| Sample I.D. | Phase quantification (wt %) |
| --- | --- |
| As jet milled LLZTO powder | 97 wt % cubic garnet<br>2 wt % $La_2Zr_2O_7$<br>1 wt % $La_2O_3$ |
| LLZTO powder is baked at 50° C. for 7 days | 98 wt % cubic garnet<br>1 wt % $La_2Zr_2O_7$<br>1 wt % $LaTaO_4$ |
| LLZTO powder is baked at 200° C. for 4 hrs and then at 50° C. for 8 days | 98 wt % cubic garnet<br>1 wt % $La_2Zr_2O_7$<br>1 wt % $LaTaO_4$ |

Figure 6:
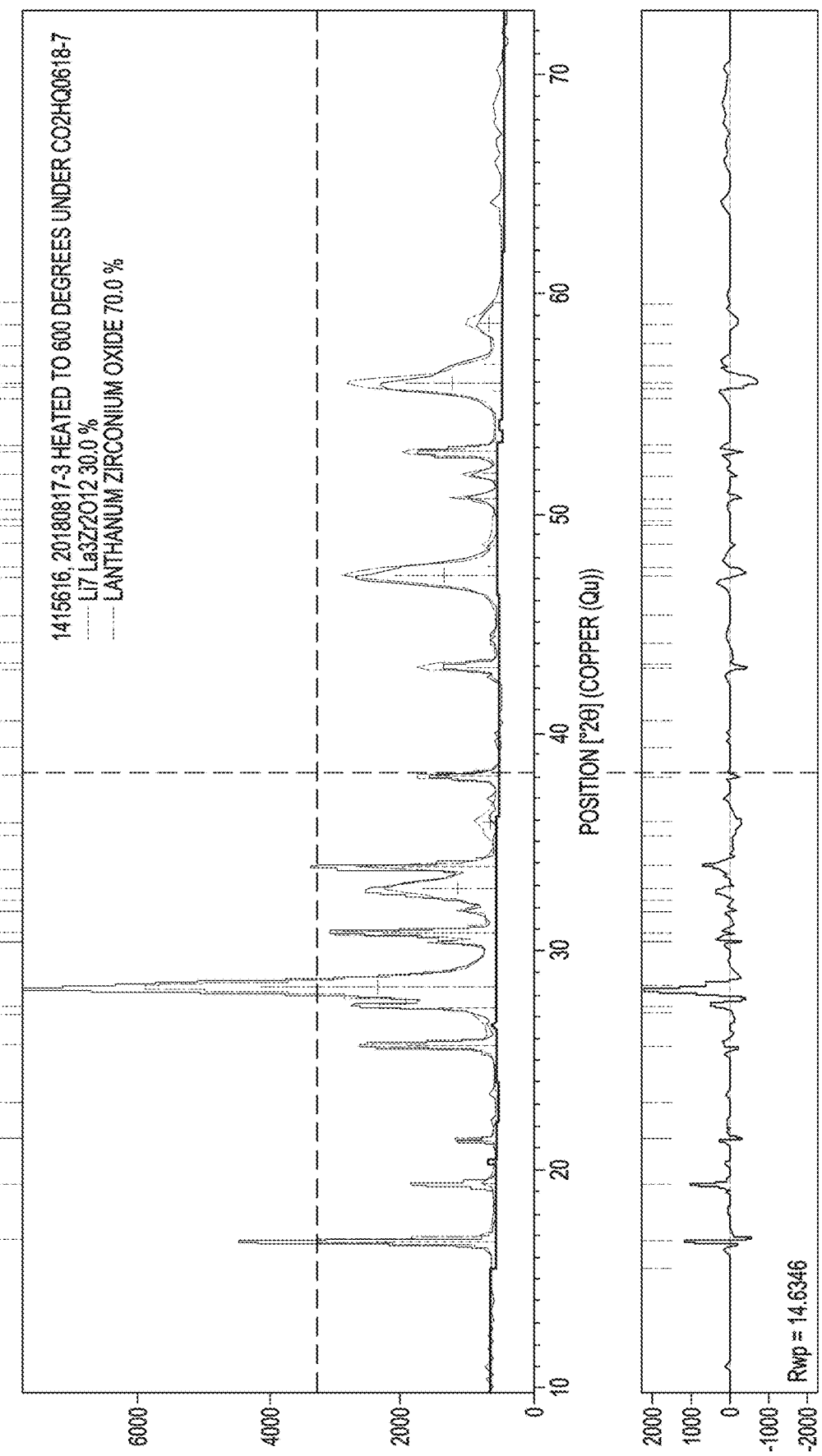
FIG. 6 illustrates an XRD of Ta-LLZO powder heated at 600° C. for 4 hrs in $CO_2$ gas.

Example I-3. Carbonation of Garnet Powder $CO_2$ can react with garnet at high temperature directly and cause decomposition. FIG. 6 illustrates an XRD of Ta-LLZO powder heated at 600° C. for 4 hrs in $CO_2$ gas. The resulted powder contained 30 wt % cubic garnet and 70 wt % $La_2Zr_2O_7$. $Li_2CO_3$ is not detectable by XRD.

Example I-4. TGA Measurements of Ta-LLZO Powders

Figure 7:
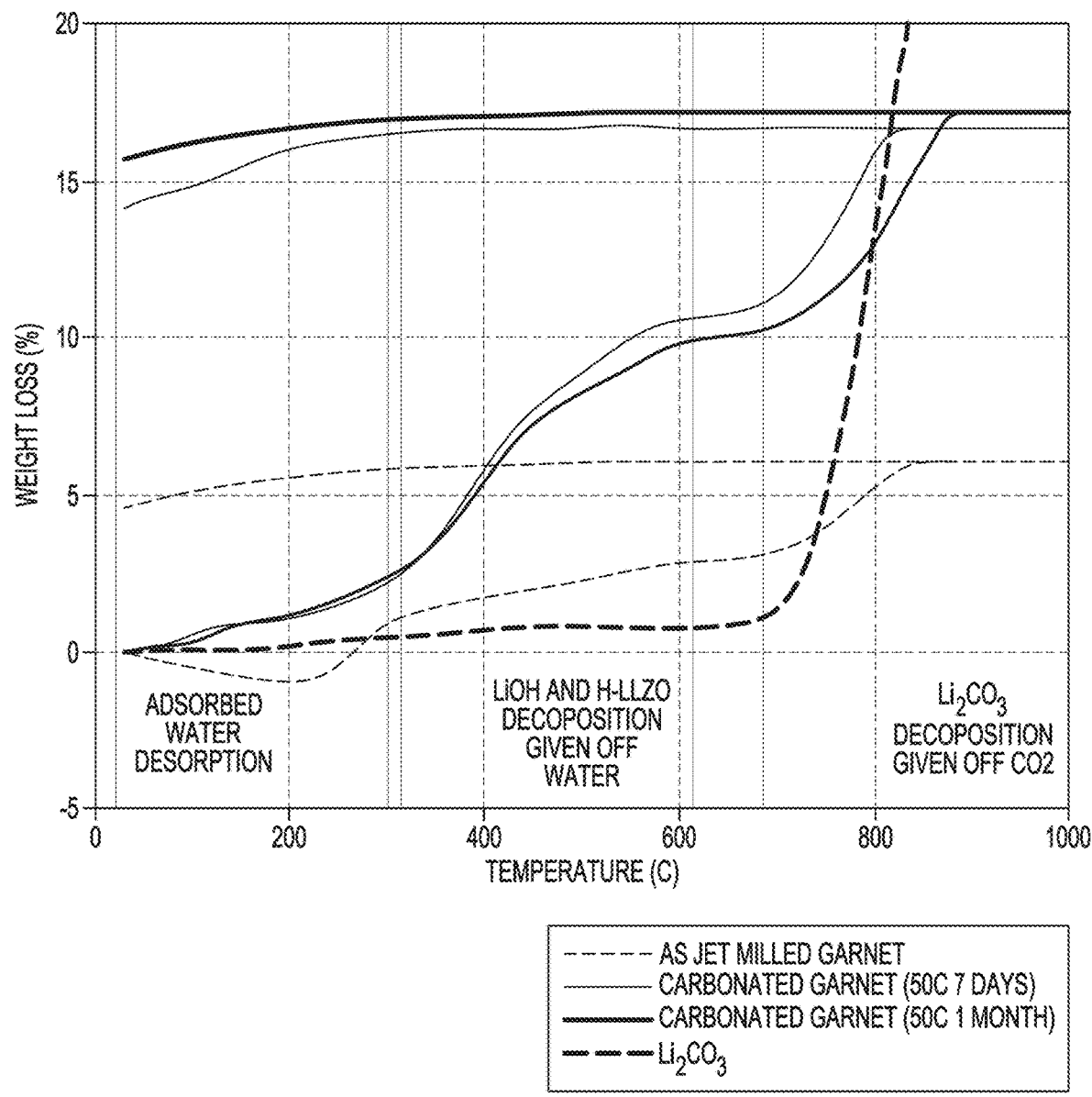
FIG. 7 illustrates the TGA measured weight losses vs. heating temperature for the as jet milled Ta:LLZO, for Ta:LLZO that was carbonated at 50° C. for 7 days, for Ta:LLZO that was carbonated at 50° C. for 1 month, and for a pure $Li_2CO_3$ powder

FIG. 7 illustrates the TGA measured weight losses vs. heating temperature for the as jet milled Ta:LLZO, for Ta:LLZO that was carbonated at 50° C. for 7 days, for Ta:LLZO that was carbonated at 50° C. for 1 month, and for a pure $Li_2CO_3$ powder. One difference for the as milled powder from the rest powders is at the temperature lower than 300° C., the as milled powder first gained weight till 200° C. followed by a loss of weight which peaked at 300° C., while the rest only lost weight from room temperature to 300° C. This phenomenon indicates that the as prepared powder particles bear some LLZO garnet surfaces which are active in adsorbing water and/or $CO_2$. The heating accelerated the adsorption. At the temperature range from 25° C. to 300° C., the major desorption material is physisorbed and/or chemisorbed water and $CO_2$.

At temperature from 300° C. to 600° C., the weight loss was from decomposition of LiOH and H-LLZO, and giving off water. At temperature above 700° C., the weight loss was from the decomposition of $Li_2CO_3$ and giving off $CO_2$. The adsorbed water, LiOH+H-LLZO, and $Li_2CO_3$ induced weight losses are listed in Table 3.

TABLE 3

TGA analysis results.

| | Adsorbed water | LiOH + H—LLZO Decompostion formed water | $Li_2CO_3$ Decomposition formed $CO_2$ | $Li_2CO_3$ layer thickness (nm) |
| --- | --- | --- | --- | --- |
| As jet milled Ta:LLZO | 0.97% | 1.82% | 3.22% | 8.02 |
| 50° C. 7 days carbonated Ta:LLZO | 2.42% | 8.25% | 6.01% | 14.65 |
| 50° C. 1 mon carbonated Ta:LLZO | 2.42% | 7.57% | 7.15% | 17.28 |

Comparing the 7 day and 1 month carbonated powder, the 7 day carbonated powder contained slightly more LiOH, indicating the reaction from LiOH to $Li_2CO_3$ may involve some slow processes, which may be the permeation of water and $CO_2$ through the $Li_2CO_3$ layer for further carbonation. However, the TGA curves of these two powders are very close, indicating a short carbonation time may be enough for passivating the garnet particles.

Example I-5. SEM Measurement of $Li_2CO_3$ Layer on Garnet

Figure 8A:
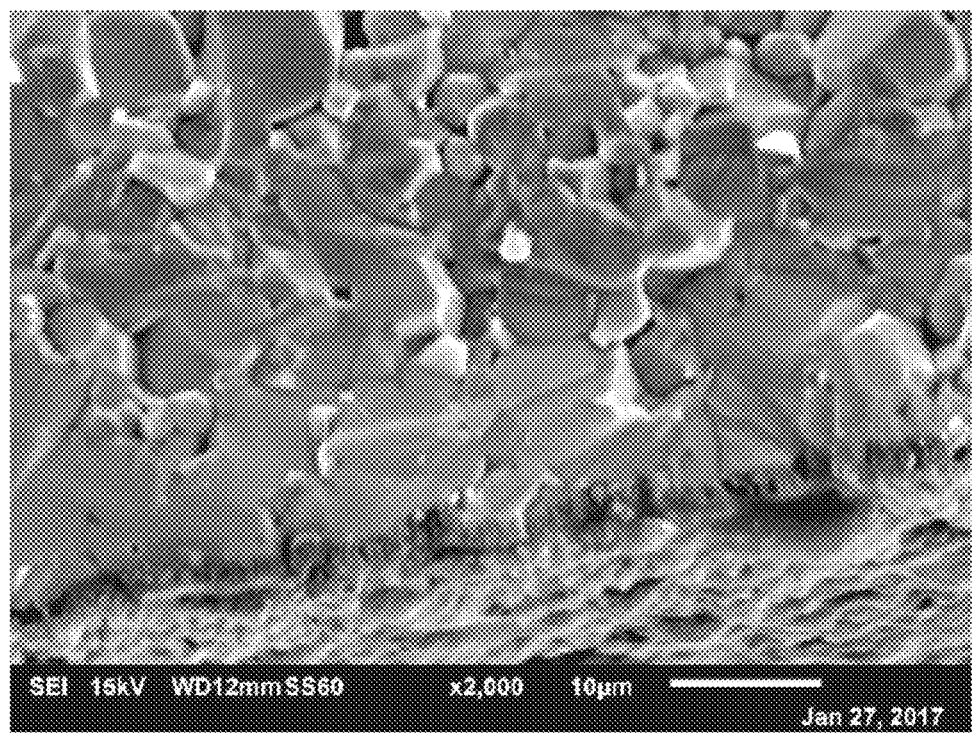
FIG. 8A illustrates a cross-sectional SEM image of a fractured carbonated hot-pressed garnet pellet.
Figure 8B:
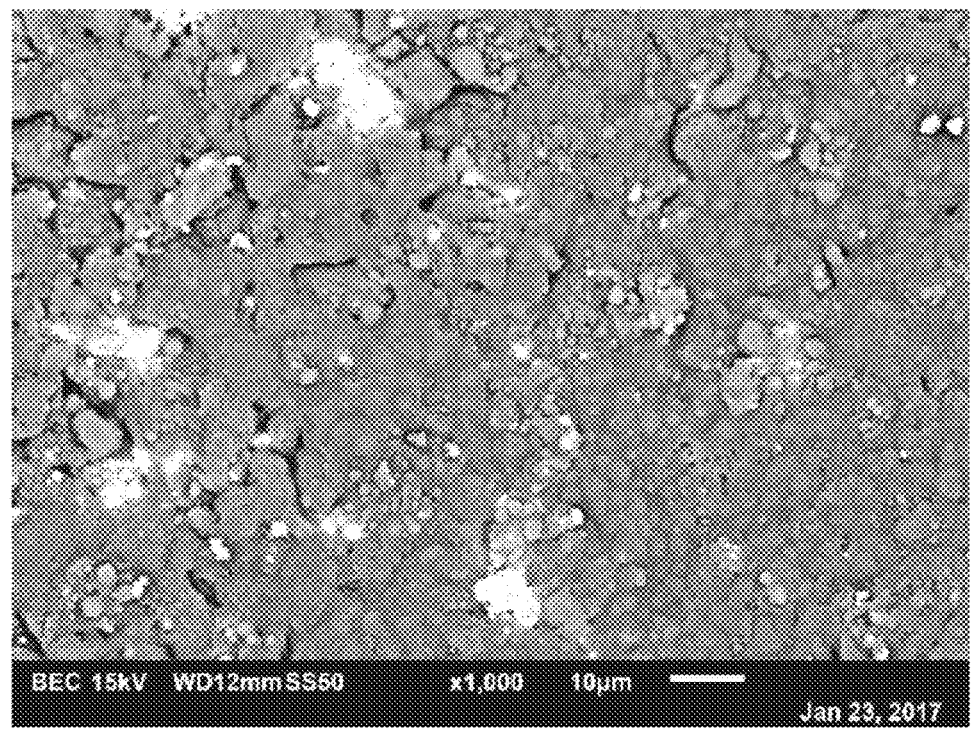
FIG. 8B illustrates a surface SEM image of a fractured carbonated hot-pressed garnet pellet.

In this experiment, a hot-pressed pellet sample was used, because such sample can have transgranular fracture, with which SEM can show clearly the passivated layer on the surfaces. FIG. 8A illustrates a SEM image of a fractured surface of a garnet pellet near the surface region. A layer of darker feature with a thickness of ~1 um can be clearly observed. This darker layer is $Li_2CO_3$. This sample was baked in a 90° C. oven for 7 days together with a cup of water. Due to the higher temperature and high humidity, the observed $Li_2CO_3$ layer thickness should be much thicker than the $Li_2CO_3$ layer formed at the above-described condition, 50° C. in normal room humidity air. The $Li_2CO_3$ layer shown in this SEM image at the garnet surface indicates the core-shell structure of a garnet particle after carbonation treatment. FIG. 8B illustrates a SEM image of the surface region of same garnet pellet, and clearly shows that the $Li_2CO_3$ is not a dense layer. Therefore, the estimated $Li_2CO_3$ layer thickness in Table 3 should be a minimum number. EDS analysis showed that the white features in the $Li_2CO_3$ were La-rich.

Figure 9:
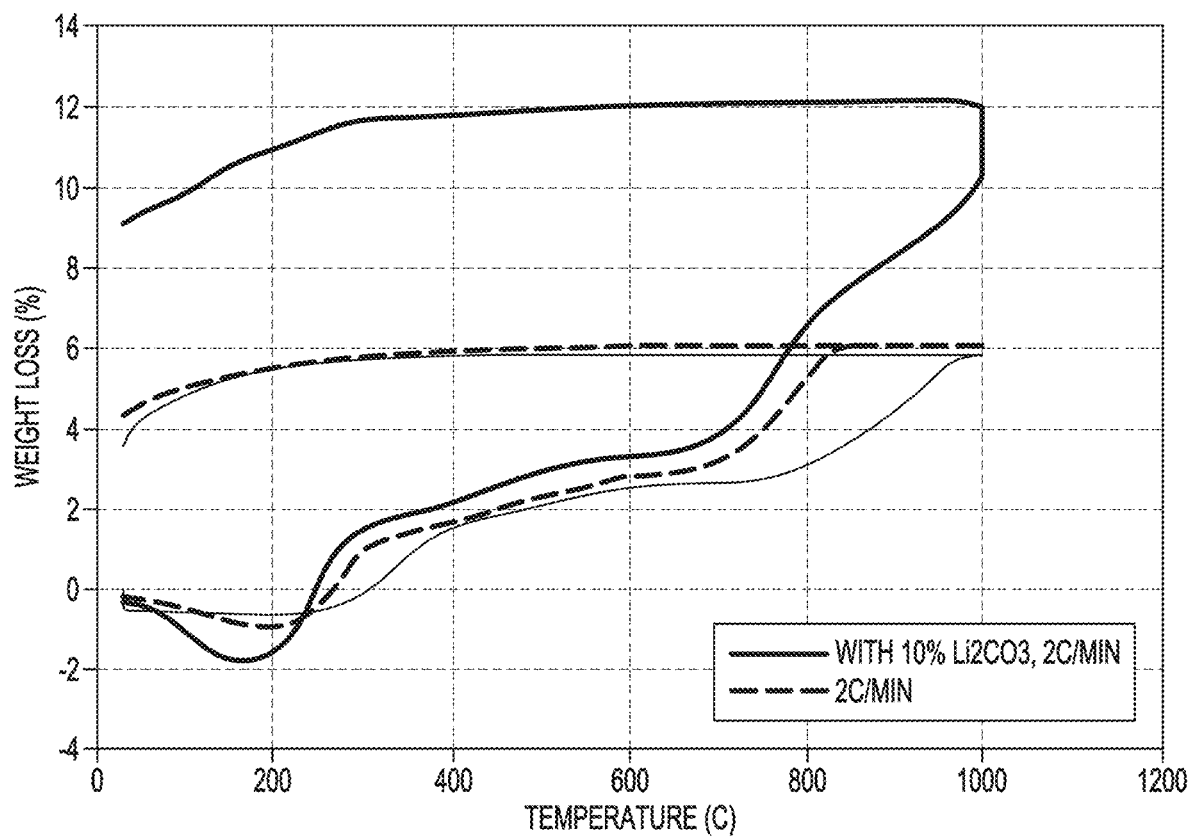
FIG. 9 illustrates a TGA plot for Ta:LLZO at at two different heating speed, and with/without addition $Li_2CO_3$.
Figure 10A:
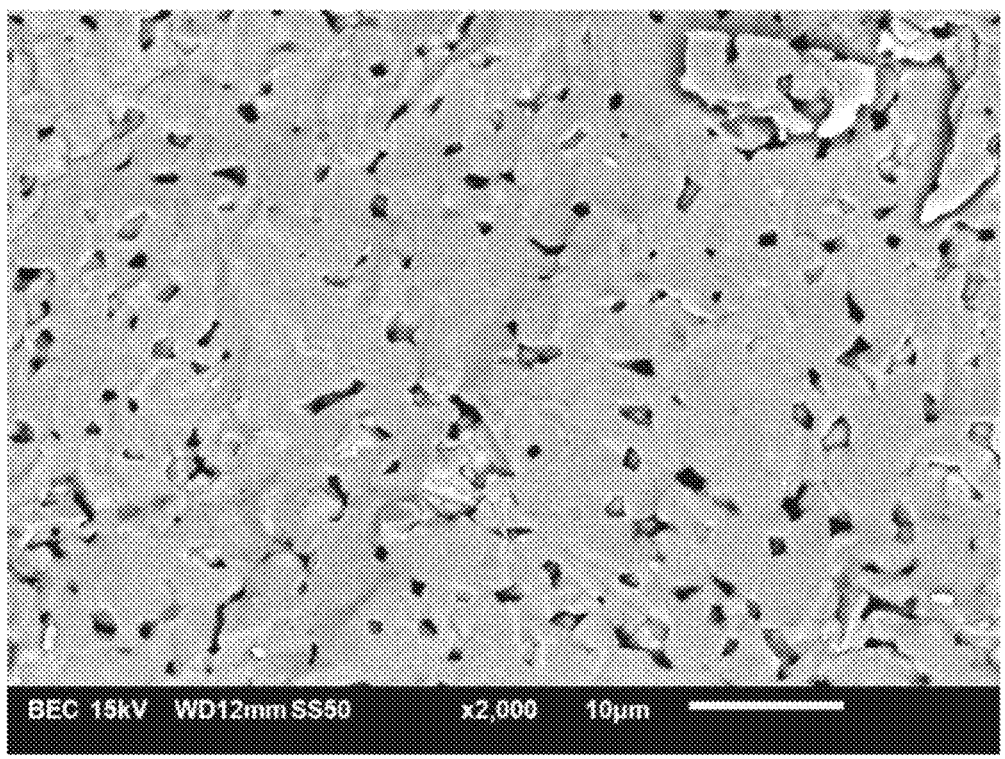
FIG. 10A illustrates a SEM image of a sintered tape including 5% excess Li that was sintered at 1250° C. in air for 3 min.
Figure 10B:
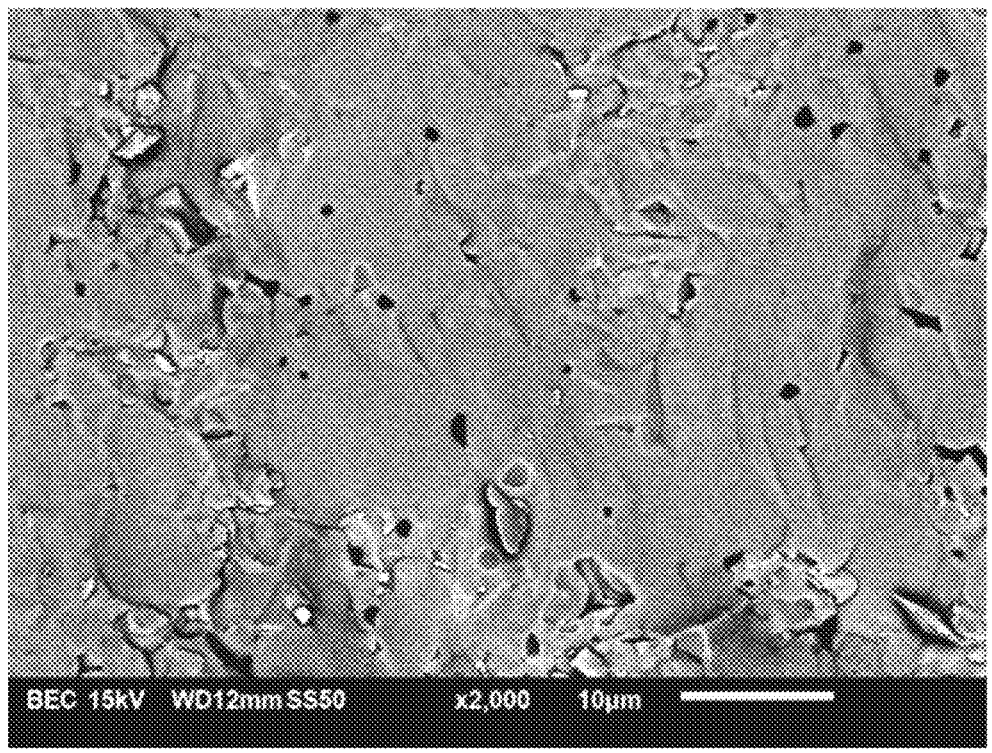
FIG. 10B illustrates a SEM image of a sintered tape including 5% excess Li that was sintered at 1300° C. in air for 3 min.
Figure 10C:
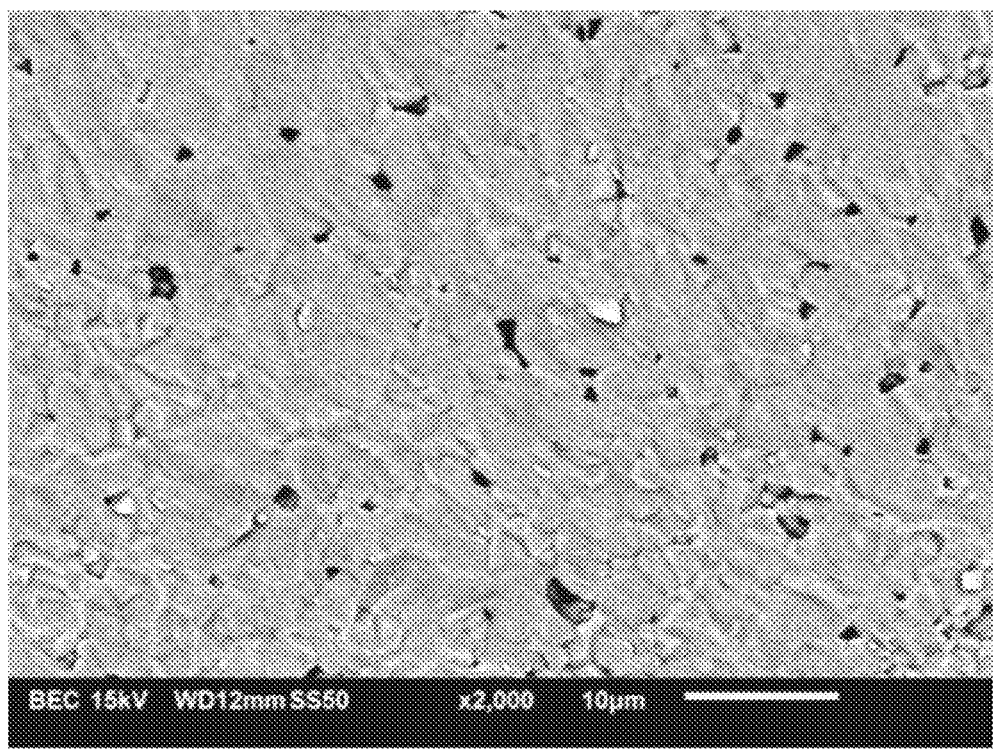
FIG. 10C illustrates a SEM image of a sintered tape including 10% excess Li that was sintered at 1200° C. in air for 3 min.
Figure 10D:
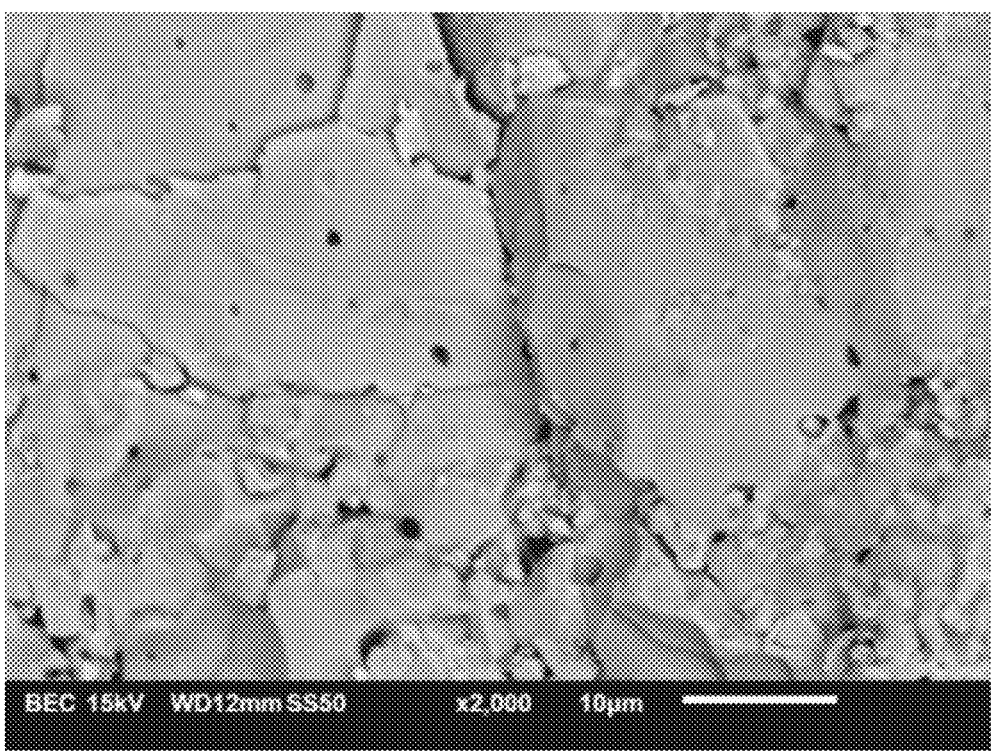
FIG. 10D illustrates a SEM image of a sintered tape including 10% excess Li that was sintered at 1250° C. in air for 3 min.
Figure 10E:
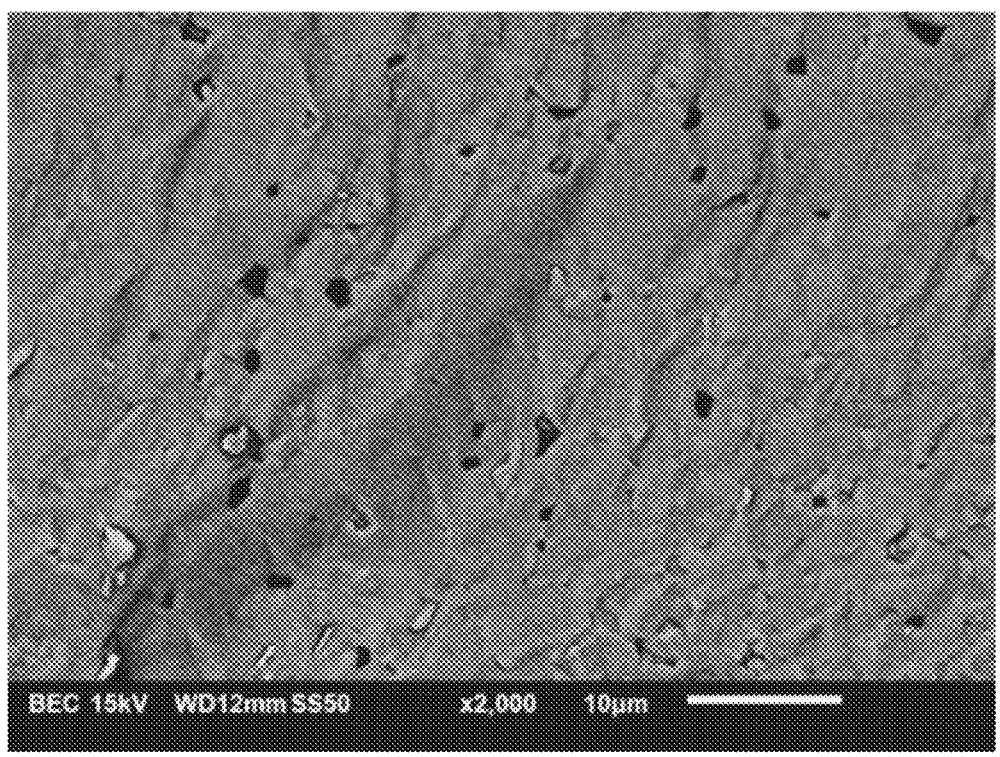
FIG. 10E illustrates a SEM image of a sintered tape including 20% excess Li that was sintered at 1200° C. in air for 3 min.
Figure 10F:
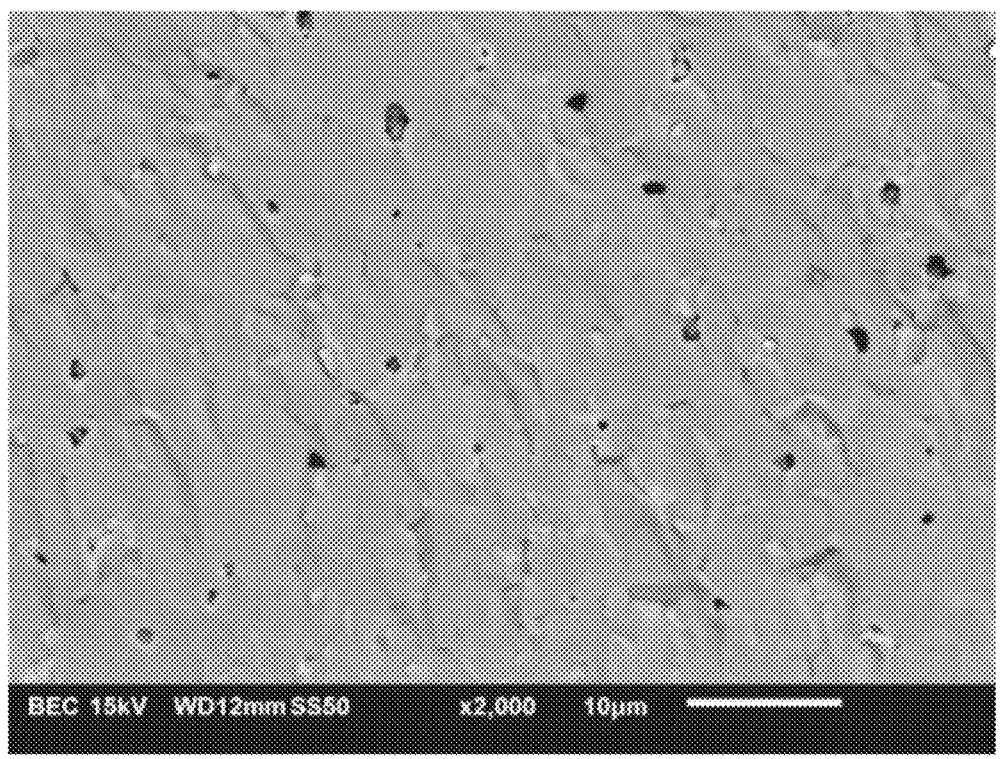
FIG. 10F illustrates a SEM image of a sintered tape including 20% excess Li that was sintered at 1250° C. in air for 3 min.
Figure 10G:
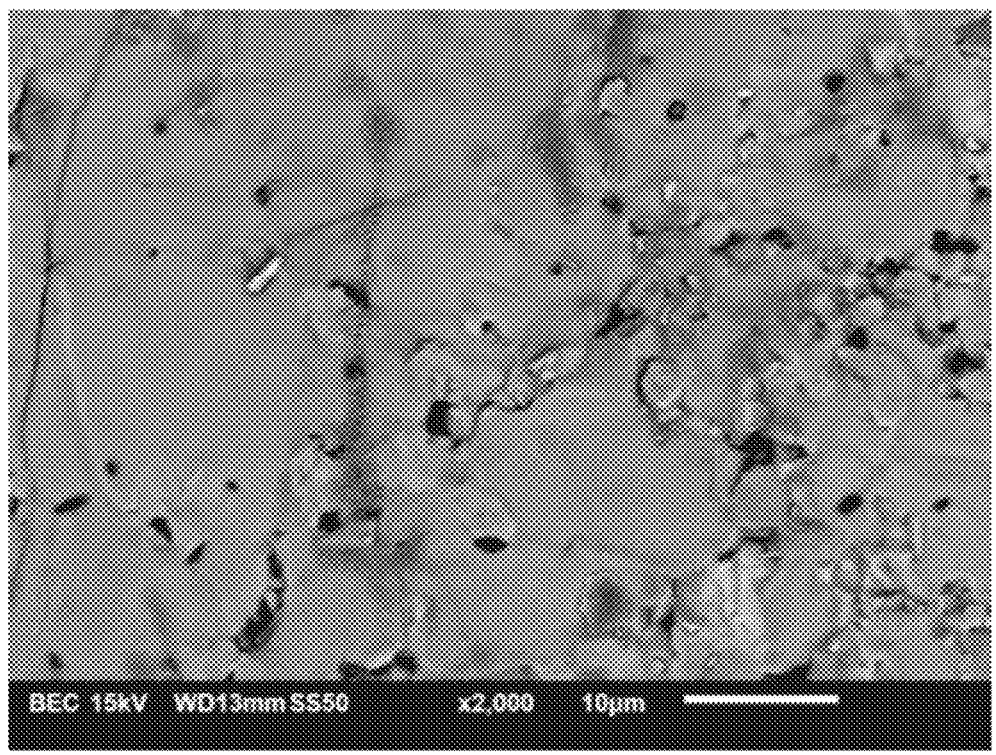
FIG. 10G illustrates a SEM image of a sintered tape including 20% excess Li that was sintered at 1300° C. in air for 3 min.
Figure 10H:
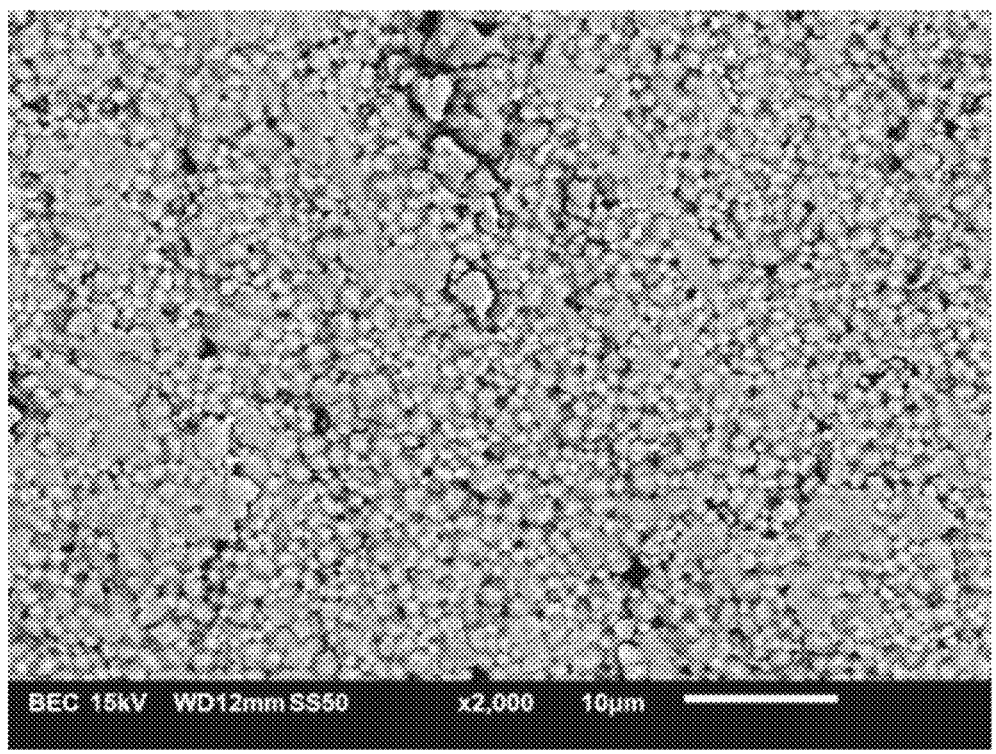
FIG. 10H illustrates a SEM image of a sintered tape including 25% excess Li that was sintered at 1200° C. in air for 3 min.
Figure 10I:
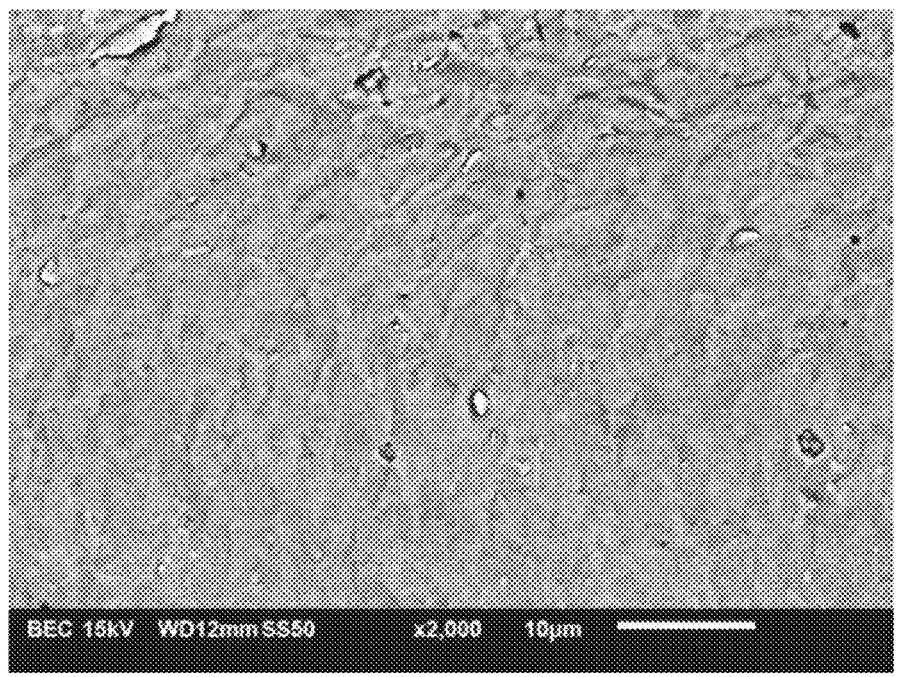
FIG. 10I illustrates a SEM image of a sintered tape including 25% excess Li that was sintered at 1200° C. in air for 10 min.
Figure 10J:
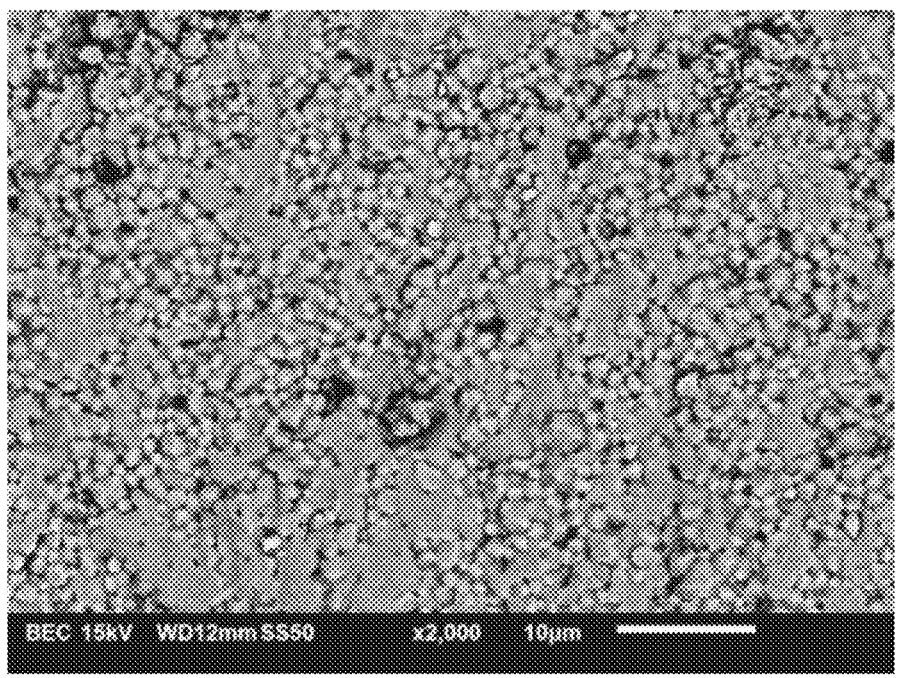
FIG. 10J illustrates a SEM image of a sintered tape including 30% excess Li that was sintered at 1250° C. in air for 3 min.
Figure 10K:
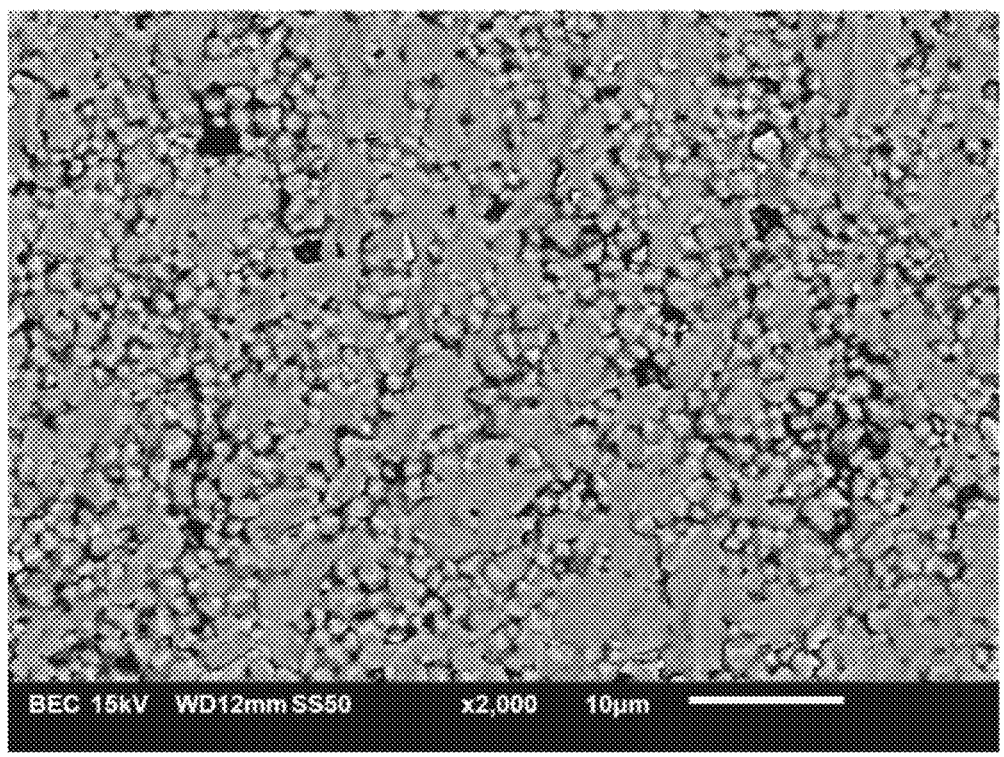
FIG. 10K illustrates a SEM image of a sintered tape including 40% excess Li that was sintered at 1200° C. in air for 3 min.
Figure 10L:
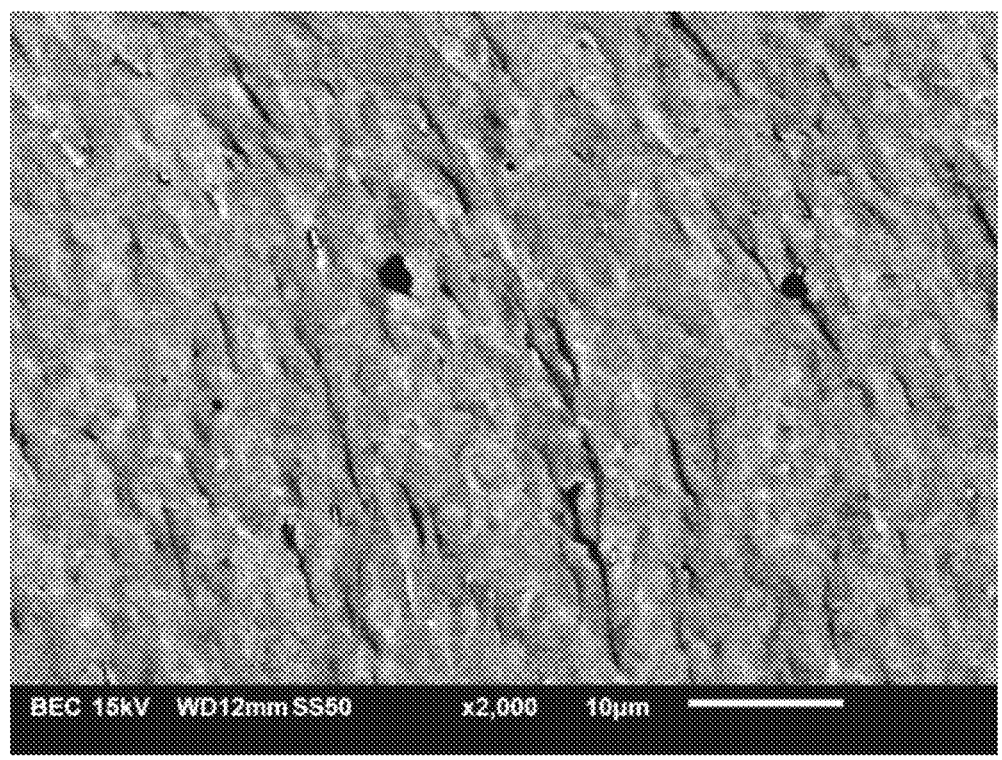
FIG. 10L illustrates a SEM image of a sintered tape including 40% excess Li that was sintered at 1200° C. in air for 15 min.
Figure 10M:
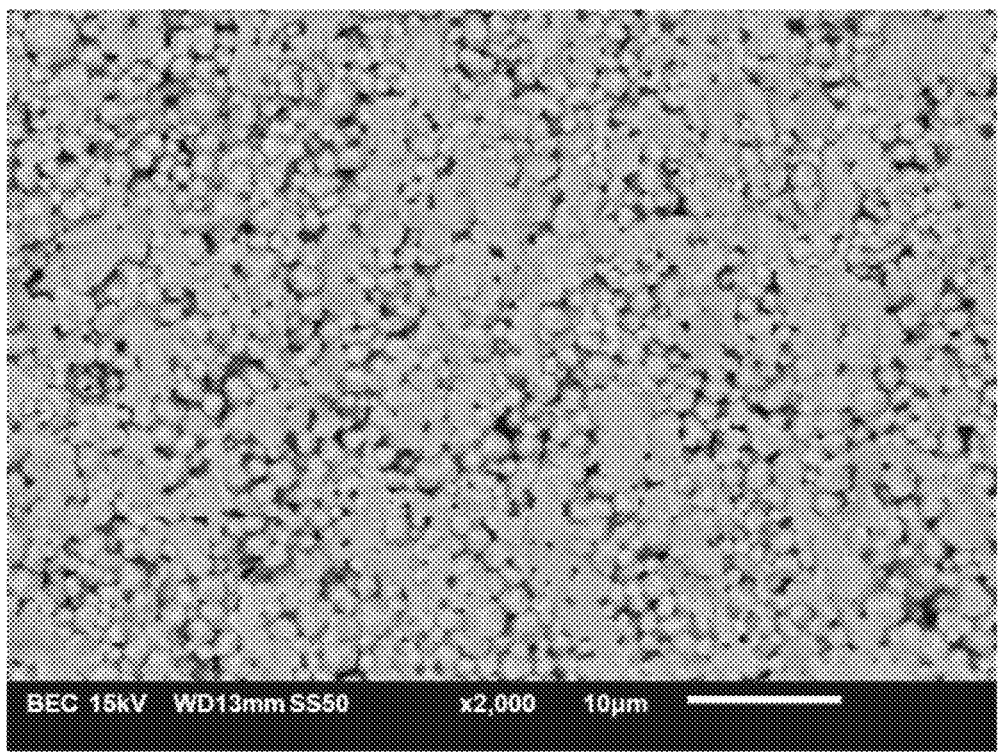
FIG. 10M illustrates a SEM image of a sintered tape including 50% excess Li that was sintered at 1200° C. in air for 3 min.
Figure 10N:
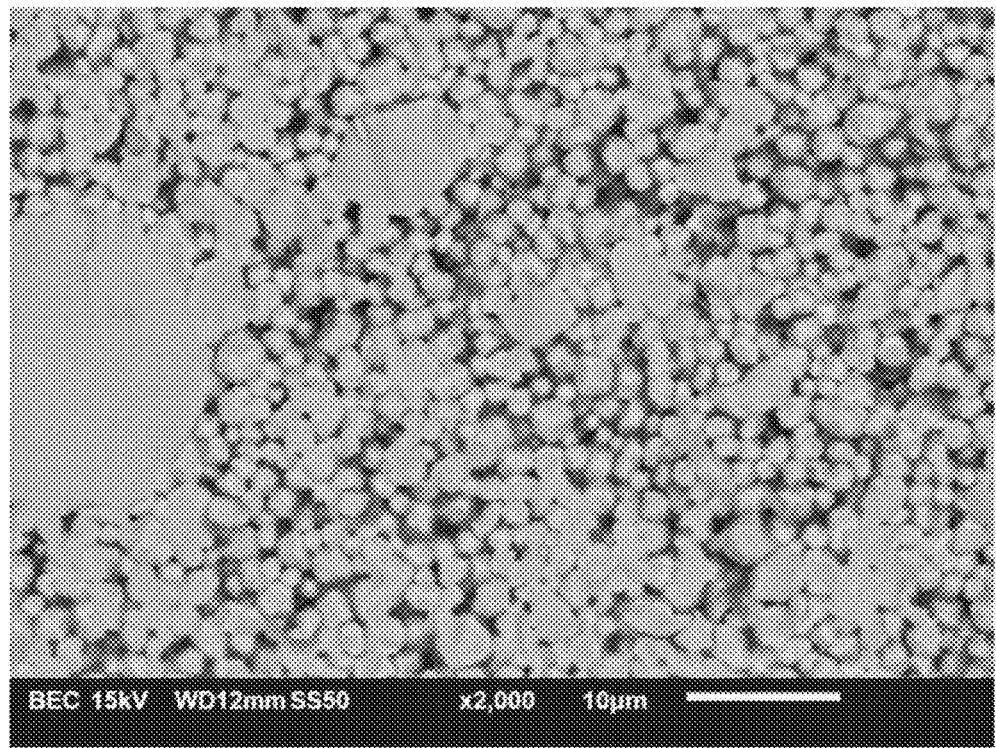
FIG. 10N illustrates a SEM image of a sintered tape including 50% excess Li that was sintered at 1250° C. in air for 3 min.

Example I-6. $Li_2CO_3$ Liquid Phase Temperature Vs. Heating Speed and $Li_2CO_3$ Amount FIG. 9 shows three TGA experiments to compare (1) the heating speed impact on the $Li_2CO_3$ phase existing temperature, (used the same garnet powder to heat at 2 C/min and 8 C/min); (2) the impact of $Li_2CO_3$ amount (by adding 10 wt % of $Li_2CO_3$ into the garnet powder, and run TGA at 2° C./min). With the slower heating speed 2° C./min, $Li_2CO_3$ in the as milled powder finished the decomposition at 820° C. With the faster heating (8° C./min), $Li_2CO_3$ finished the decomposition at 1000° C. With additional $Li_2CO_3$, the $Li_2CO_3$ decomposition curve can be extended to ~1200° C. All these $Li_2CO_3$ melted at ~730° C., and stayed as liquid phase in the powder system, and can greatly enhance the garnet sintering, and compensate the Li loss at high temperature.

Example I-7. Tape Casting

Table 4 shows one slip composition for tape casting of a Ta-doped garnet powder and $Li_2CO_3$ at a 20% excess Li level. D-118 was DISPERBYK®-118. As used herein, "excess lithium" means the percent extra lithium based on the garnet stoichiometric amount of lithium. For example, in Table 4, the Ta-doped garnet powder had 20% excess lithium compared to the stoichiometric amount of lithium in 0.5Ta:LLZO garnet ($Li_{6.5}La_3Zr_{1.5}Ta_{0.5}O_{12}$).

TABLE 4

Slip composition.

| | Components | Mass (g) | Wt % |
|---|---|---|---|
| solid | 0.5Ta:LLZO | 100 | 45.35 |
| solid | $Li_2CO_3$ | 5.5 | 2.49 |
| Dispersant | D-118 | 3.37 | 1.53 |
| Plasticizer | n-butyl stearate (NBS) | 5.84 | 2.65 |
| Solvent in vehicle | PP: n-Propyl propionate | 89.75 | 40.70 |
| Binder in vehicle | Elvacite 2046 | 16.05 | 7.28 |

When using a freshly jet milled Ta:LLZO powder to cast a tape with slip composition described in Table 4, the tape stays flexible for only a couple of days. After that, the tape turns brittle.

When use a carbonated jet milled Ta:LLZO powder to cast a tape with the Table 4 slip composition, the tape stays flexible for many months.

Example I-8. Fast Sintering of Garnet Tapes

FIG. 10 illustrates cross section SEM images of fast sintered tapes of ~80 μm in thickness with different amounts of excess Li in the form of $Li_2CO_3$, and sintered in the temperature range of 1200° C.-1300° C. in air at a temperature ramp up rate of 500° C./min. FIG. 10A illustrates a SEM image of a sintered tape including 5% excess Li that was sintered at 1250° C. in air for 3 min. FIG. 10B illustrates a SEM image of a sintered tape including 5% excess Li that was sintered at 1300° C. in air for 3 min. FIG. 10C illustrates a SEM image of a sintered tape including 10% excess Li that was sintered at 1200° C. in air for 3 min. FIG. 10D illustrates a SEM image of a sintered tape including 10% excess Li that was sintered at 1250° C. in air for 3 min. FIG. 10E illustrates a SEM image of a sintered tape including 20% excess Li that was sintered at 1200° C. in air for 3 min. FIG. 10F illustrates a SEM image of a sintered tape including 20% excess Li that was sintered at 1250° C. in air for 3 min. FIG. 10G illustrates a SEM image of a sintered tape including 20% excess Li that was sintered at 1300° C. in air for 3 min. FIG. 10H illustrates a SEM image of a sintered tape including 25% excess Li that was sintered at 1200° C. in air for 3 min. FIG. 10I illustrates a SEM image of a sintered tape including 25% excess Li that was sintered at 1200° C. in air for 10 min. FIG. 10J illustrates a SEM image of a sintered tape including 30% excess Li that was sintered at 1250° C. in air for 3 min. FIG. 10K illustrates a SEM image of a sintered tape including 40% excess Li that was sintered at 1200° C. in air for 3 min. FIG. 10L illustrates a SEM image of a sintered tape including 40% excess Li that was sintered at 1200° C. in air for 15 min. FIG. 10M illustrates a SEM image of a sintered tape including 50% excess Li that was sintered at 1200° C. in air for 3 min. FIG. 10N illustrates a SEM image of a sintered tape including 50% excess Li that was sintered at 1250° C. in air for 3 min.

Table 5 illustrates a summary of the sintering structure from the SEM study. The conditions labeled with a superscript "a" are the sintering window for making high quality sintered Ta:LLZO tape which have small grains, high density, and high conductivity.

TABLE 5

Sintering structure from SEM study.

| Excess Li in green tape | 1200° C./ 3 min | 1250° C./ 3 min | 1300° C./ 3 min | 1200° C./ 10-15 min |
|---|---|---|---|---|
| 0% | Not sintered | Not sintered | Sintered w. many pores. TGF* | |
| 5% | Not sintered | Sintered w. many pores. TGF* | Sintered w. some pores, large grains, and Li lean second phase. TGF* | |
| 10% | Sintered, uniform with some pores. TGF*a | Sintered with large grains. TGF* | Sintered with extrem large grains. TGF* | Sintered with large grains. Near surface is porous. TGF* |
| 20% | Sintered, uniform with some pores. TGF*a | Sintered, uniform with some pores. TGF*a | Sintered with large grains, and Li rich second phase. TGF* | Sintered with large grains. Near surface is porous. TGF* |
| 25% | Sintered, dense, IGFa | Sintered, dense, IGFa | Sintered with large grains, IGF** | Sintered, dense, TGF*a |
| 30% | Sintered, dense, IGFa | Sintered, dense, IGFa | Sintered with large grains, IGF** | |
| 40% | Sintered, half TGF* and half IGF** | Sintered, half TGF* and half IGF** | | Sintered, dense, TGF*a |
| 50% | Sintered, half TGF* and half IGF**, some large grains | Sintered, half TGF* and half IGF**, some large grains | | Sintered, half TGF* and half IGF**, some large grains |

*TGF: transgranular fracture,
**IGF: intergranular fracture.

Figure 11:
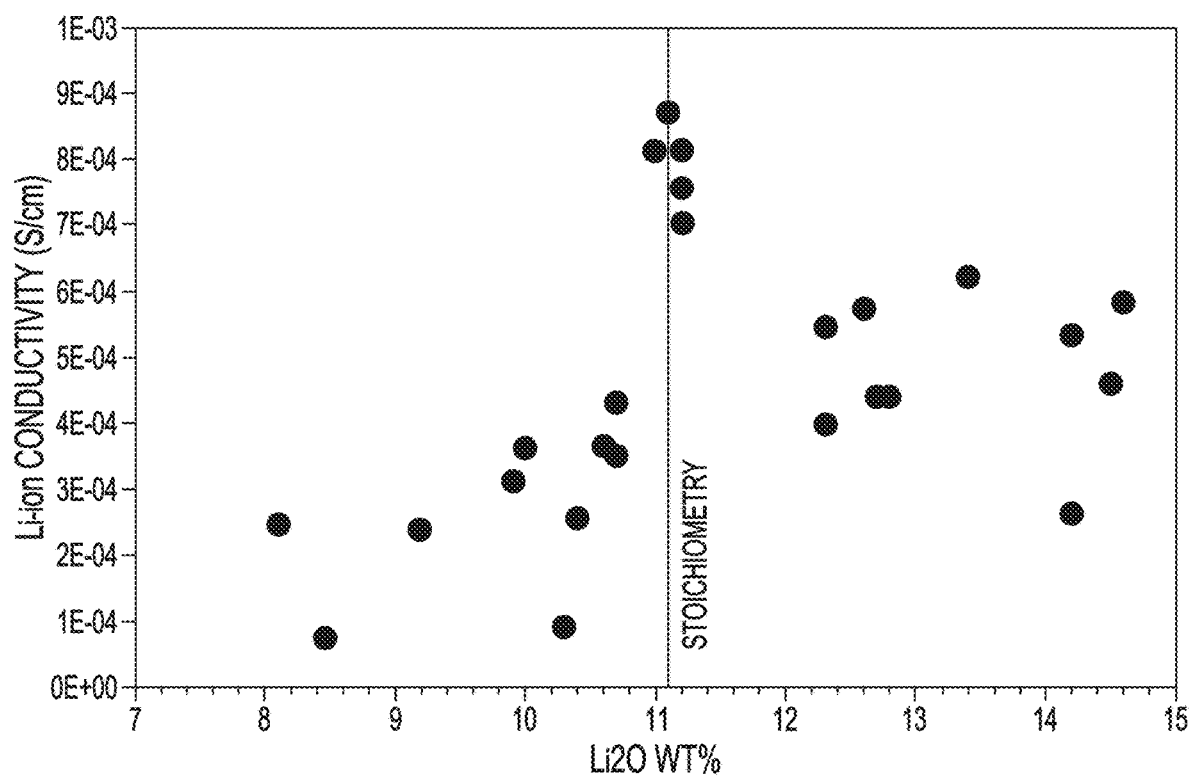
FIG. 11 illustrates sintered tape Li-ion conductivity versus Li-level in the Ta:LLZO.

Li-ion conductivity and Li content of the sintered samples were measured by AC impedance and ICP, respectively. FIG. 11 illustrates the correlation of these two parameters.

For a green tape that contains greater than 25% excess Li, the sintered tape can have Li level at or above stoichiometry level. Sintered tapes above Li stoichiometry have intergranular fracture microstructure, with the grain boundary still containing excess Li. The excess Li can prevent the grain growth to some extent, but extensive heating can cause abnormal grain growth. Li-ion conductivity decreases with the increase of Li content at this region. Longer sintering time below the grain growth temperature can reduce the Li content in the sintered tape.

For a green tape that contains less than 25% excess Li, the sintered tape can have Li-level at or below the stoichiometry level. Sintered tapes at this region have transgranular fracture microstructure, indicating clean grain boundaries. However high temperature can cause large grain growth. Li-ion conductivity decreases with the decrease of the Li content.

Sintered tapes with the Li-level at the stoichiometry have the highest Li-ion conductivity.

When green tape contains 10% excess Li, the sintered tape contains 98-100% cubic garnet phase as measured by XRD.

Example I-9. Slow Firing of Garnet Tape

Figure 12A:
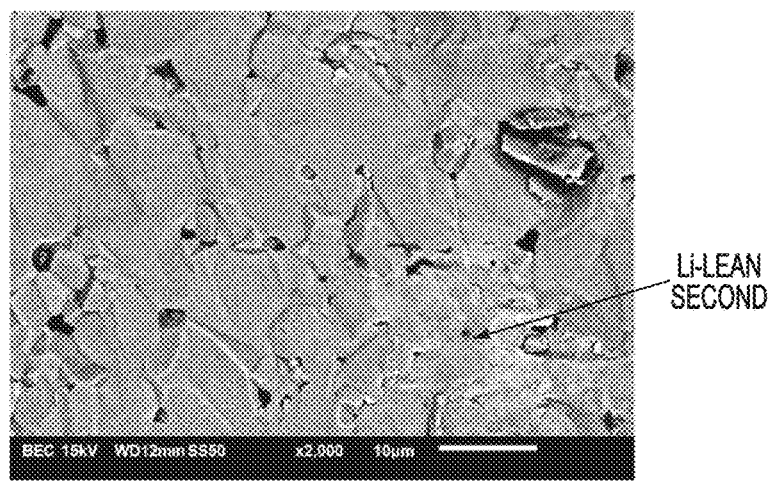
FIG. 12A illustrates a SEM image of garnet tape formed using 20% excess Li and sintered via slow firing at 1230° C. for 5 min.
Figure 12B:
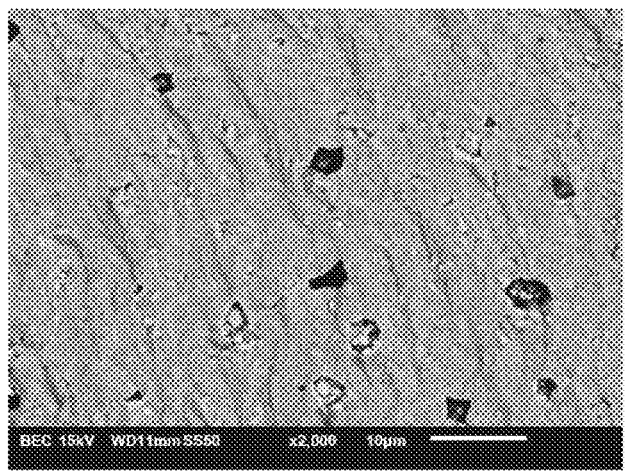
FIG. 12B illustrates a SEM image of garnet tape formed using 25% excess Li and sintered via slow firing at 1230° C. for 5 min.
Figure 12C:
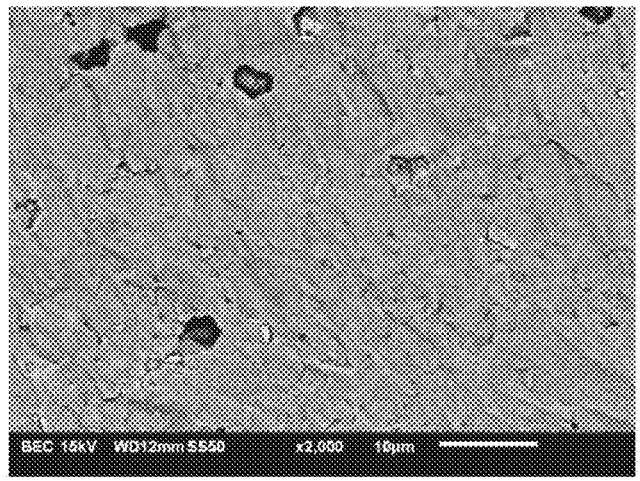
FIG. 12C illustrates a SEM image of garnet tape formed using 30% excess Li and sintered via slow firing at 1230° C. for 5 min.

Garnet batch firing was done by sandwich garnet tape in between graphite foils, and heating in Ar with a temperature ramp up speed of 200° C./hr (3.3° C./min). FIGS. 12A-C illustrate the SEM images of some best sintered tapes. FIG. 12A illustrates a SEM image of garnet tape formed using 20% excess Li and sintered via slow firing at 1230° C. for 5 min. FIG. 12B illustrates a SEM image of garnet tape formed using 25% excess Li and sintered via slow firing at 1230° C. for 5 min. FIG. 12C illustrates a SEM image of garnet tape formed using 30% excess Li and sintered via slow firing at 1230° C. for 5 min. Compared to fast sintering, the slow firing sintered tapes were easier to generate than Li-lean second phase. All tapes contained many pores. The more $Li_2CO_3$ was present, the more and the larger pores are observed in the sintered tapes. In slow firing, $Li_2CO_3$ partially behaved like a pore former due to some of the $Li_2CO_3$ being removed before garnet sintering starts.

Part II

Example II-1. Preparation of Starting Powders

As-made garnet was made by solid state reaction from precursors: $Li_2CO_3$, $ZrO_2$, $La_2O_3$, and $Ta_2O_3$ were mixed with garnet stoichiometry ($Li_{6.5}La_3Zr_{1.5}Ta_{0.5}O_{12}$) and fired to 950° C. for 5 hrs, and 1200° C. for 5 hrs. The powder was then jet milled to 0.6 um ($D_{50}$).

Figure 13:
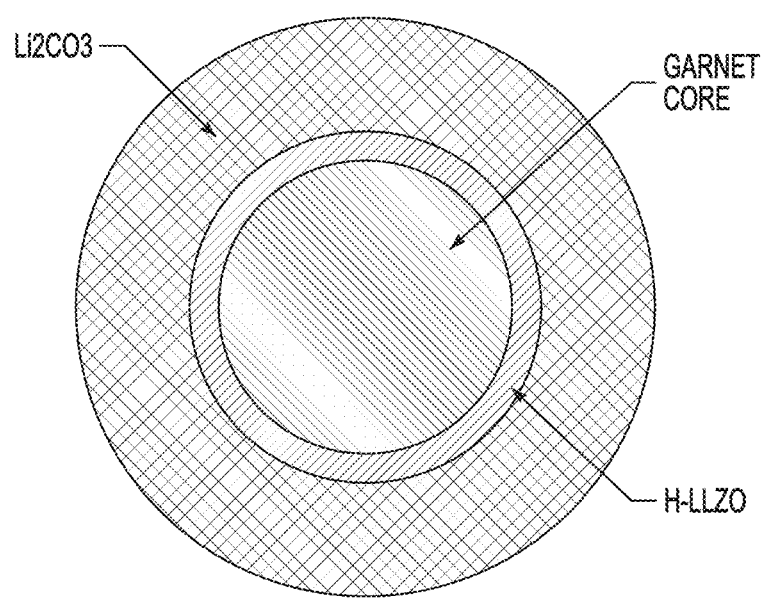
FIG. 13 illustrates the structure of an air-passivated garnet particle.

The garnet powder was then passivated by placing in a 50° C. oven for 29 days with the powder bed depth of ~2 cm. The reaction involved was $LLZO+nH_2O \rightarrow H_n\text{-}LLZO + nLiOH$ (Li—H ion exchange) and $2LiOH+CO_2 \rightarrow Li_2CO_3 + H_2O$ (Air carbonation). The obtained powder particle structure is shown in FIG. 13.

In another method of passivating the particle that included decomposition of the garnet, the as-made garnet powder was heat-treated in $CO_2$ to 600° C. for 2 hrs. The reaction was $2LLZO+8CO_2=7Li_2CO_3+2La_2Zr_2O_7+La_2(CO_3)O_2$. Table 6 shows the XRD analysis of the obtained powders:

TABLE 6

| XRD analysis of obtained powders. | |
|---|---|
| Sample I.D. | Phase quantification (wt %) |
| II-1, As-made | 92 wt % cubic garnet<br>6 wt % $La_2Zr_2O_7$<br>2 wt % $La_2O_3$ |
| II-1, Air Carbonated 60° C.- 29 days | 94 wt % cubic garnet<br>4 wt % $La_2Zr_2O_7$<br>2 wt % $La(OH)_3$ |
| II-1, 600° C.-2 hr, $CO_2$ | 73 wt % $La_2Zr_2O_7$<br>19 wt % $La_2(CO_3)O_2$<br>8 wt % $LiCO_3$ |

Example II-2. Tape Casting of the Powders of Example II-1

The powders of Example II-2 were tape cast using an Elvacite binder based slip, including n-propyl propionate/n-butyl propionate mixture (2:1 in weight) (solvent), D118 (dispersant), E2046 (binder), dibutyl phthalate (plasticizer). Both slips had good rheology and could be cast to form good quality green tapes. No excess Li was added into the green tapes.

Example II-3. Green Tape Firing

The green tapes formed in Example II-2 were fast fired to 1200° C., 1250° C., and 1300° C. for 3 min. The temperature ramping speed was 300-500° C./min. FIGS. 14A-F illustrate SEM images of the fractured surfaces of the sintered films. FIGS. 14A-C illustrate SEM images of fractured surfaces of sintered green tapes formed from passivated garnet formed at 600° C. with $CO_2$, at 1200° C. for 3 min, 1250° C. for 3 min, and 1300° C. for 3 min, respectively. FIGS. 14D-F illustrate SEM images of fractured surfaces of sintered green tapes formed from passivated garnet that was air passivated, at 1200° C. for 3 min, 1250° C. for 3 min, and 1300° C. for 3 min, respectively. At 1300° C., the passivated garnet tape sintered, while the precursors made at 600° C. with $CO_2$ did not sinter.

Figure 15A:
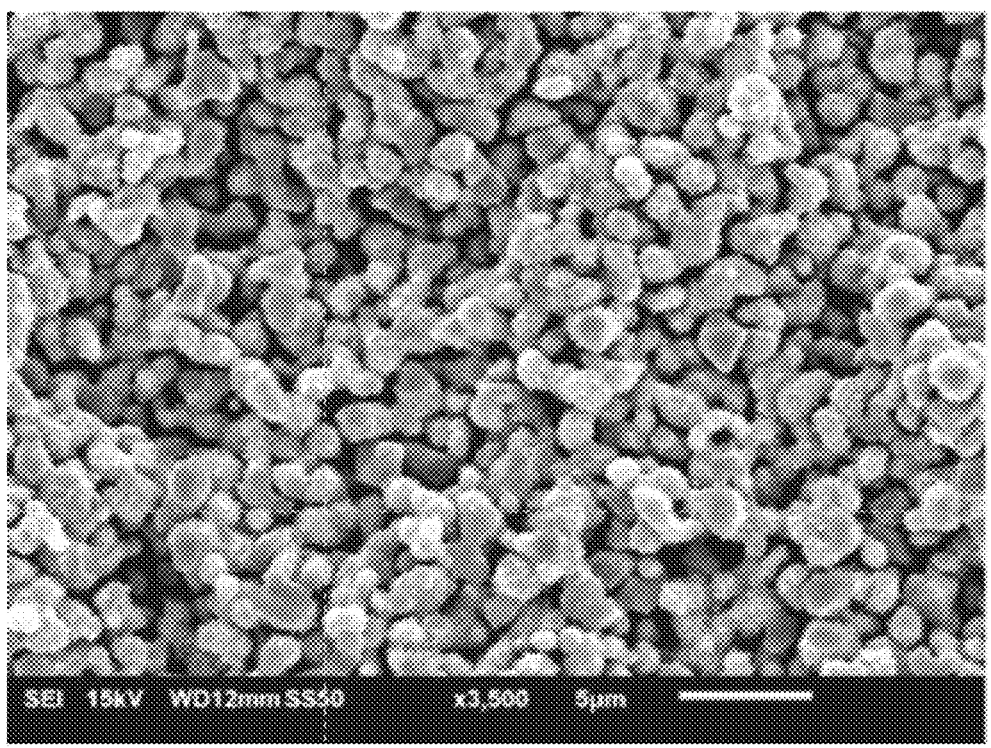
FIG. 15A illustrates a SEM image of a green tape formed from air passivated LLZTO after firing at 1200° C.
Figure 15B:
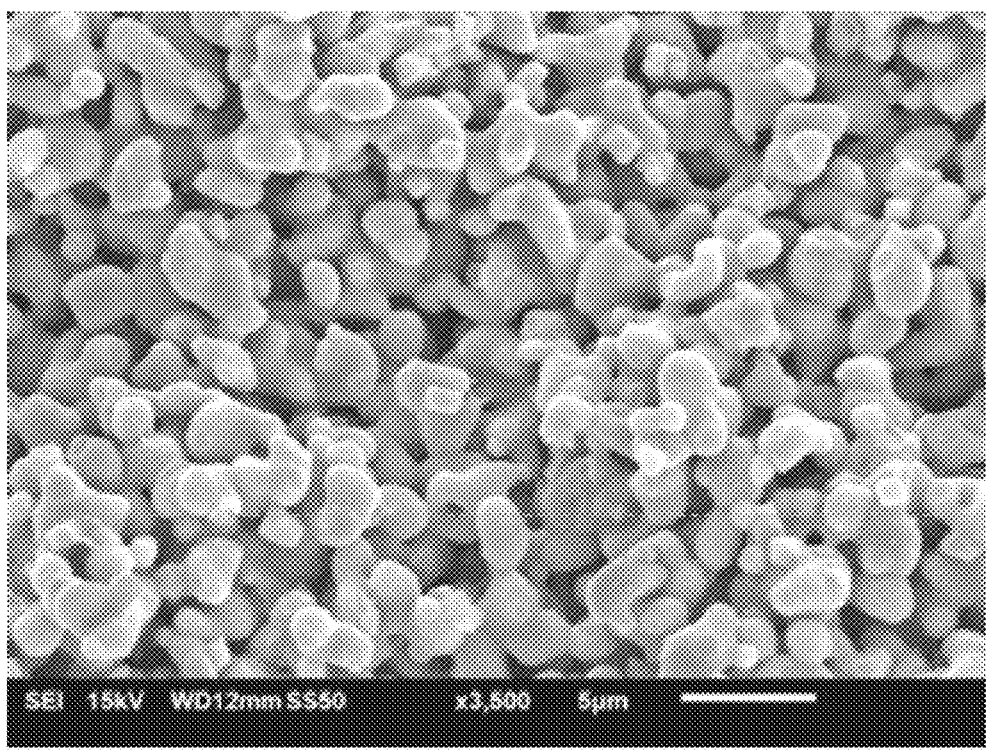
FIG. 15B illustrates a SEM image of a green tape formed from $CO_2$-passivated LLZTO after firing at 1200° C.

For both tapes, particles inside the tape increased in size with the increased sintering temperature. FIGS. 15A-B illustrate higher magnification SEM images for both tapes after firing to 1200° C., with FIG. 15A showing the tape from air passivated LLZTO, and with FIG. 15B showing the tape from CO2-passivated LLZTO. The SEM images clearly show smaller grain growth from the air passivated powder. Besides the size difference, the particle surface morphology was also different: the air passivated particle surfaces were rough, while the precursor tape particle surfaces were smooth. This indicated the air passivated powder had more Li remaining. The rough surfaces occurred from reaction with $H_2O$ and $CO_2$ in air formed $Li_2CO_3$.

Figure 16A:
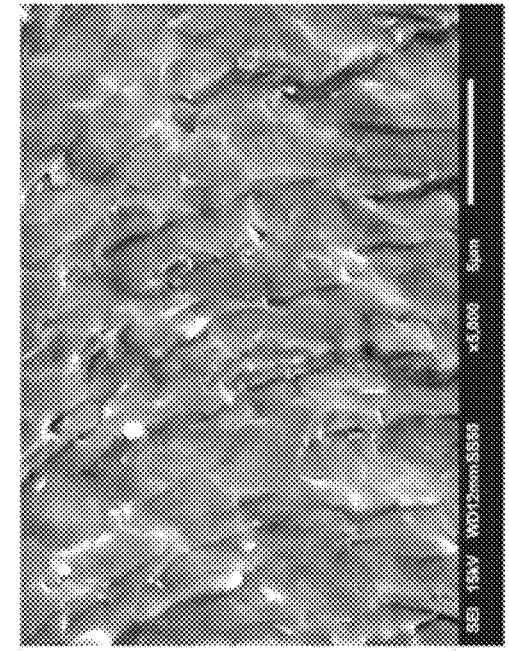
FIG. 16A illustrates a SEM image of an air passivated powder tape with 10 wt % added $Li_2CO_3$ as the excess Li and that was fast fired at 1200° C. for 15 min.
Figure 16B:
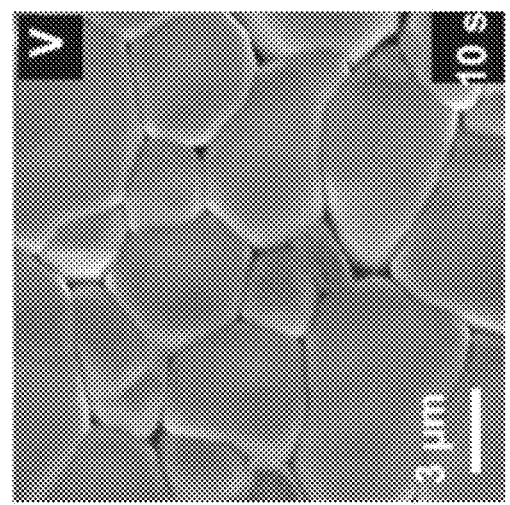
FIGS. 16B-C illustrates comparative SEM images of sintered garnet tapes.
Figure 16C:
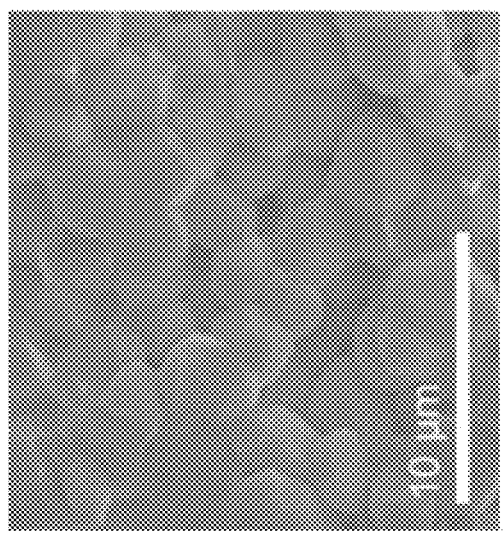

FIG. 16A illustrates the air passivated powder tape with 10% excess Li added as $Li_2CO_3$, and fast fired at 1200° C. for 15 min. Dense tape with fine grains (~1 μm) was obtained. Two garnet microstructure from literature used precursors as starting powders are also shown in FIG. 16B and FIG. 16C for grain size comparison, with FIG. 16B showing an image from Science 368, 521-526 (2020) (raw materials sintered at 1500 C for 10 s in Ar, grain size 3-10 microns) and with FIG. 16C showing an image from J. Mater. Chem A, 2016, 4, 12947-12954 (raw materials sintered at 1090 C for 1 h in Ar, grain size 2-5 microns). The images of FIGS. 16B-C show larger grain size than FIG. 16A.

Example II-4. Garnet Powder Passivation Process Control

Figure 17:
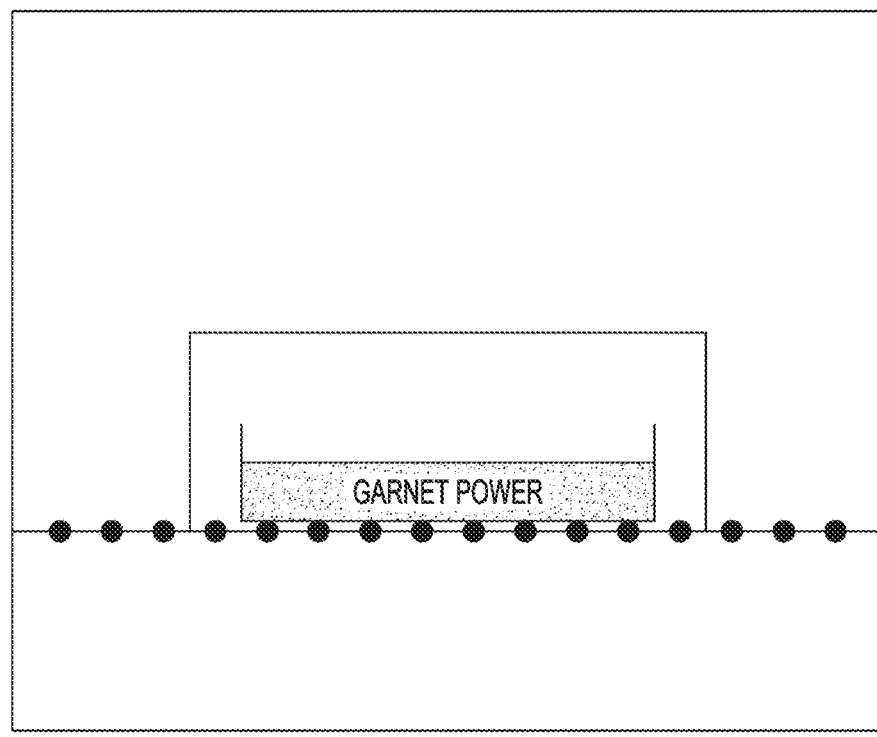
FIG. 17 illustrates an apparatus for garnet powder low temperature passivation/aging treatment at 50-110° C.

For low temperature passivation treatment, garnet powder was held in a shallow container, such as a petri dish, a weighing bowl, or any other container, with a powder bed thickness of 2-3 cm. The container was placed in an oven on a metal rack. The temperature of the oven is set to 50° C. to 110° C. The container was covered with a much larger container to prevent dust falling on the powder. Air could migrate from the bottom of the rack to meet with the powder. FIG. 17 illustrates the apparatus used.

Figure 18:
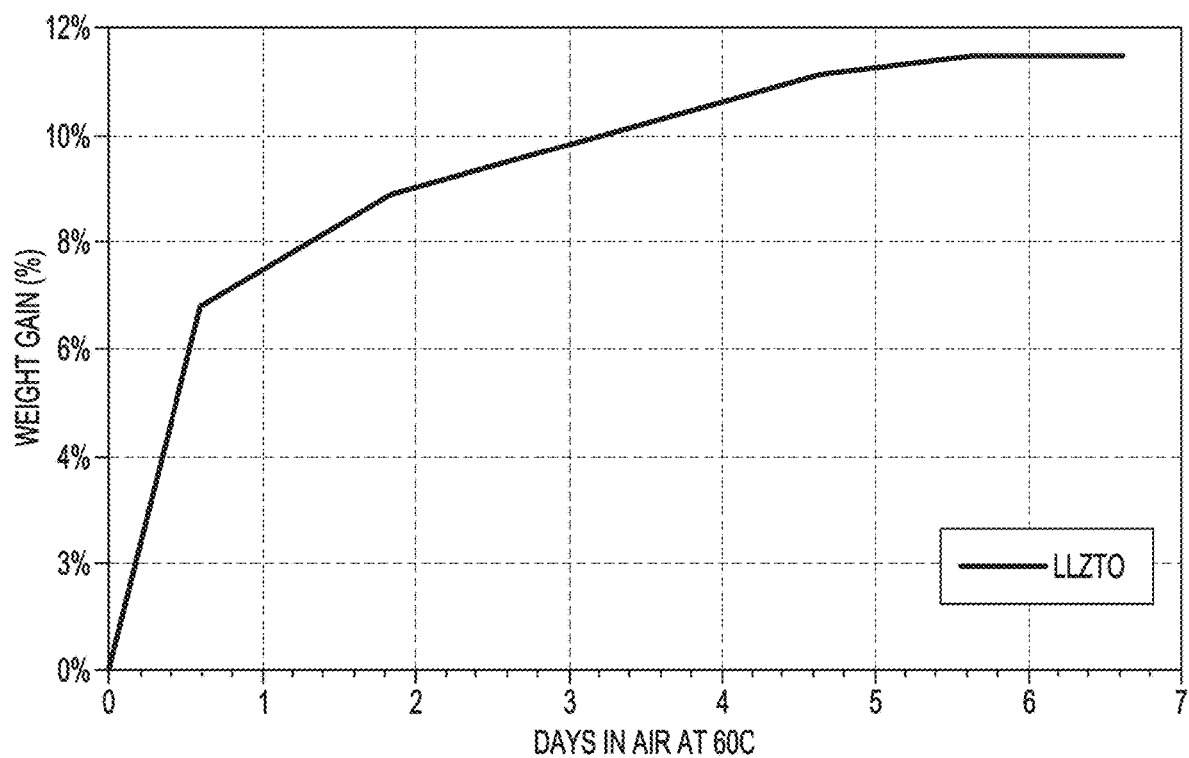
FIG. 18 illustrates weight gain versus days in air at 60° C. for jet milled garnet powder.

FIG. 18 illustrates shows a small amount/thin layer of as jet-milled garnet powder weight gain vs. time in a 60° C. oven. The curve raised quickly at the beginning and turned flat after about 1 week. This indicated that the powder reaction with air is a self-limited process, by which when the $Li_2CO_3$ and H-LLZO shells formed on particles were thick enough, the diffusion of $H_2O$ and $CO_2$ to the inner pure garnet core became too slow to be observed; or the pure garnet core disappeared (e.g., all garnet has become H-LLZO). Such garnet can be called "fully passivated garnet" or "well aged garnet".

However, when treating large amounts of powder, it was found that the powder easily forms a shell on top, which may reduce the gas diffusion speed to deeper part of the powder. A longer treatment time may be needed to obtain a uniformly passivated powder.

Figure 19C:
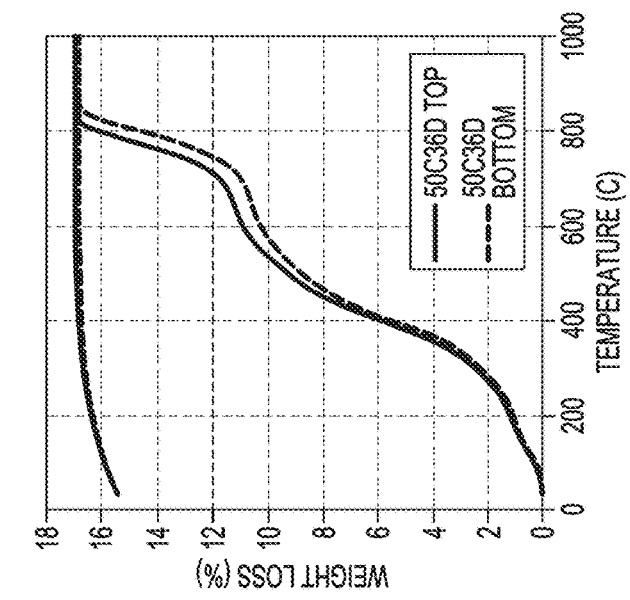
FIGS. 19A-C illustrates TGA curves showing weight loss versus temperature for passivated powders samples from the top and bottom of the powder bed, with passivation conditions of 110° C. for 4 days, 50° C. for 22 days, and 50° C. for 36 days, respectively.
Figure 19B:
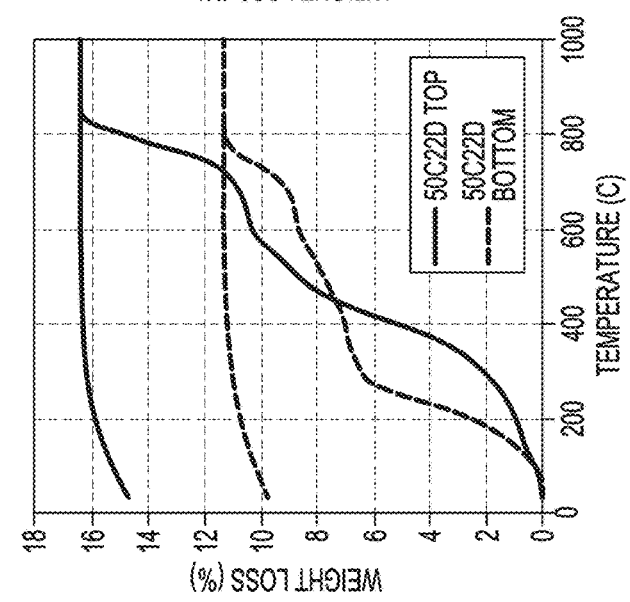
Figure 19A:
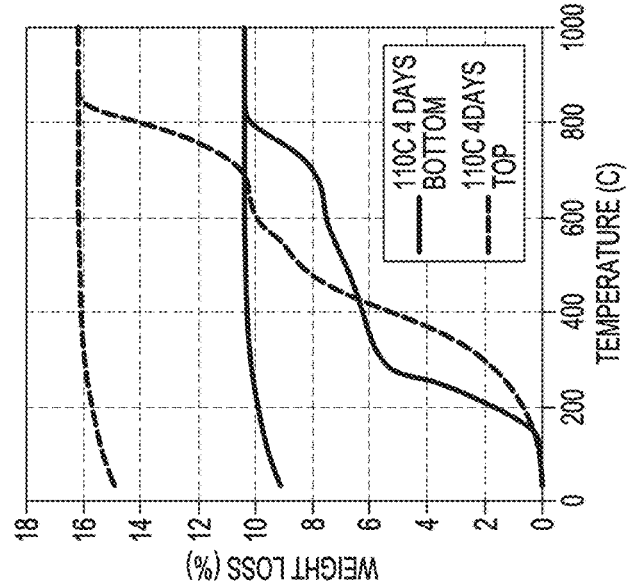

FIGS. 19A-C illustrate TGA curves showing weight loss versus temperature for passivated powders samples from the top and bottom of the powder bed, with passivation conditions of 110° C. for 4 days, 50° C. for 22 days, and 50° C. for 36 days, respectively. The measured powders were sampled from top and bottom of the powder beds. All powders at the top had weight loss of ~16%, indicating a well passivated powder; however, the powders at the bottom, for shorter treatment time, had much less weight loss, indicating the passivation of those powder at the bottom were not sufficient. The powder that was treated at 50° C. for 36 days had the TGA curves from top and bottom nearly overlapping with each other, indicating that this powder was uniformly and fully passivated.

Figure 20:
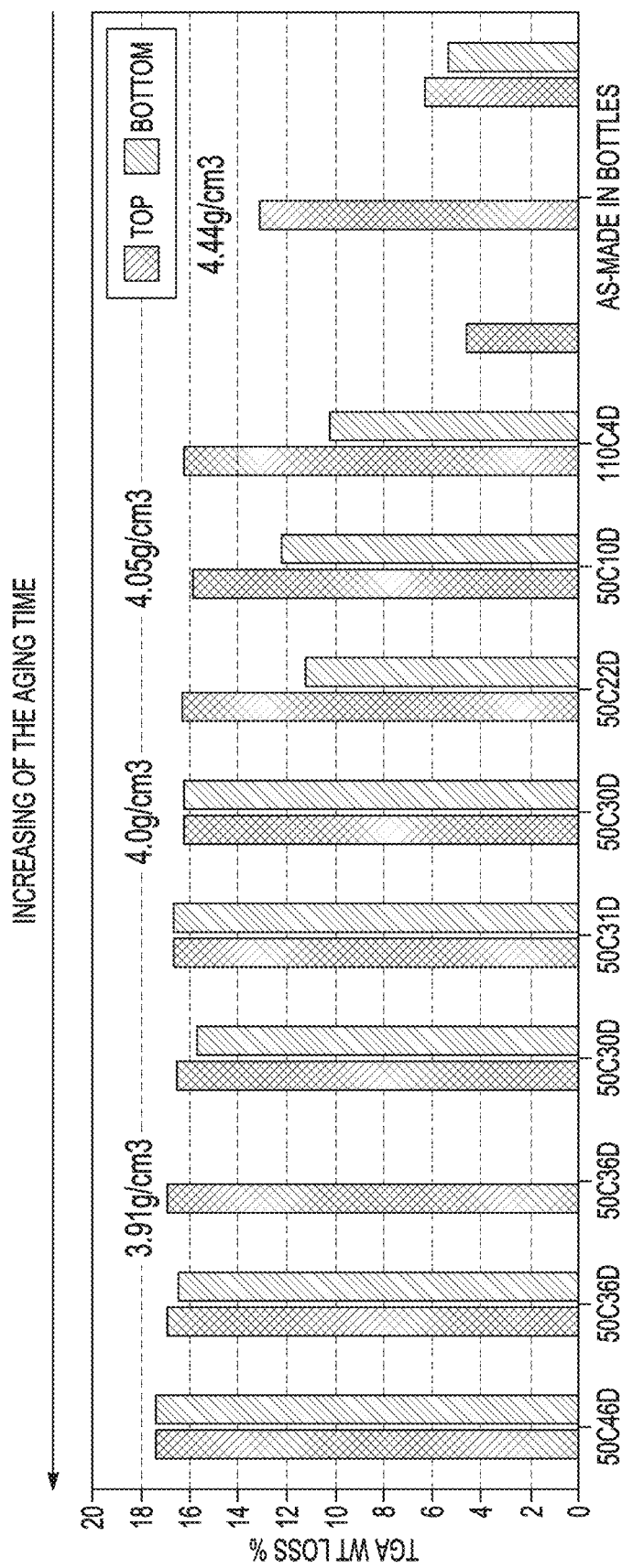
FIG. 20 illustrates garnet TGA weight loss from the top and bottom of the powder bed for powders passivated at 50° C. for different lengths of time, or directly from bottle that were shelved for different lengths of time, or aged for 30 days and sealed in bottle for 62 days.

FIG. 20 illustrates TGA weight loss from the top on bottom for various powders passivated at 50° C. for different lengths of time, or directly from bottles that were shelved for different lengths of time, or aged for 30 days and sealed in a bottle for 62 days. These density data were measured by He pycnometry. The results are organized in approximate order of least dense (left side) to most dense (right side) with density measurements for four different samples appearing above the respective sample in the plot. Aging time increased from right to left in the plot, with the aging temperature and time (in days) shown in the sample name. FIG. 20 illustrates more TGA weight loss data after the powder were aged at 50° C. for different lengths of time and compared with powders in bottles after different shelf times. The powder in the bottles (the "as jet-milled powder") changed its weight with time and had different weight loss top to bottom in the bottle. Therefore, when using an "as-jet milled powder", care should be taken is the powder density is important. When the powder was treated at 50° C. for more than 30 days, it became uniform and stable. One powder, which was aged at 50° C. for 30 days and then sealed in a bottle for 62 days, was found to be the same as those aged 30-46 days at 50° C. Because the powder absorbed $H_2O$ and $CO_2$ when aging, the powder density decreased.

Besides the fact that not enough passivation may cause green tape to decay faster, so far, no evidence has been obtained that the non-uniformly aged powder can do any harm for garnet tape sintering. However, due to the powder density variation, it is hard to add a consistent amount of excess Li from batch to batch for tape casting. In addition, the powder density change can also result in tape solid loading change, which is another important factor that can impact tape sintering. Because garnet sintering can be very sensitive to the amount of excess Li, to keep the process consistent and to make reproducible sintered tapes, it can be preferable to use a uniformly aged and fully aged powder.

Figure 21A:
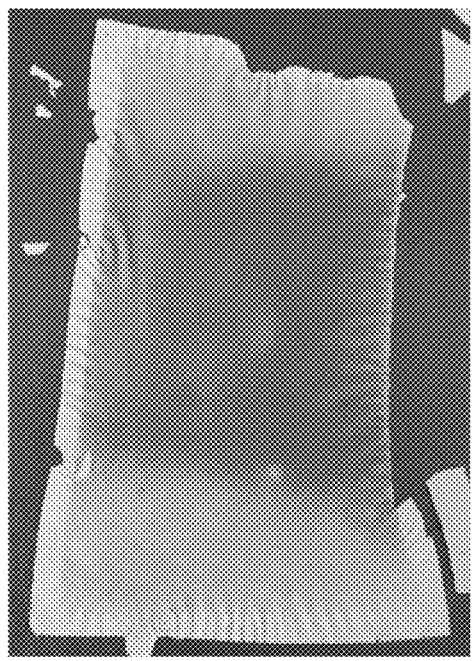
FIG. 21A illustrates a photograph of a batch sintered tape formed from a tape containing a 110° C. 4 day aged powder and 5.5 wt % $Li_2CO_3$.
Figure 21B:
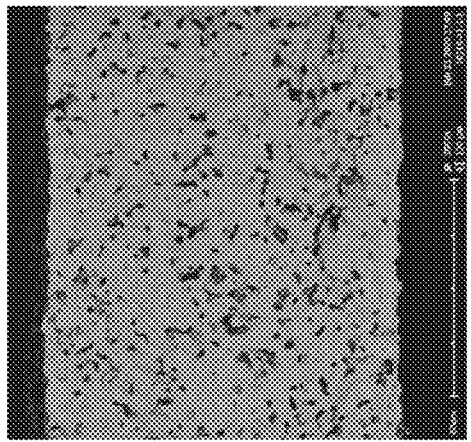
FIG. 21B illustrates a fracture cross section SEM image of the dark area in FIG. 22A.
Figure 21C:
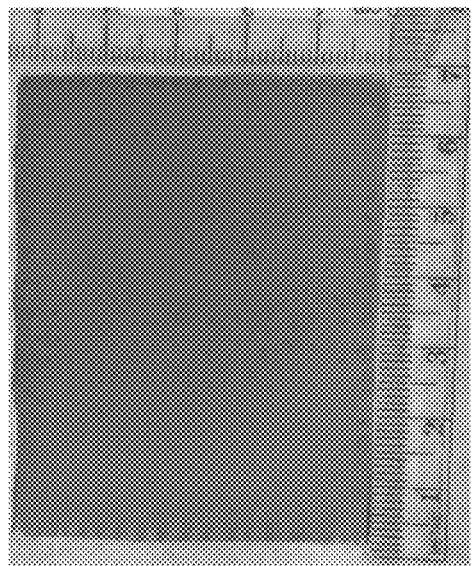
FIG. 21C illustrates a photograph of a batch sintered tape formed from a tape including a 50° C. 30 day aged powder and 5.5 wt % $Li_2CO_3$.
Figure 21D:
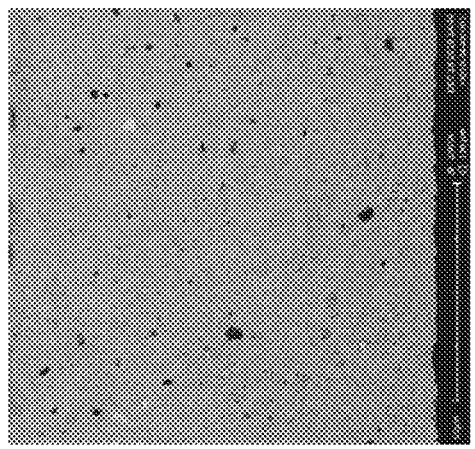
FIG. 21D illustrates a fracture cross-section SEM image of the dark area in FIG. 22C.
Figure 21E:
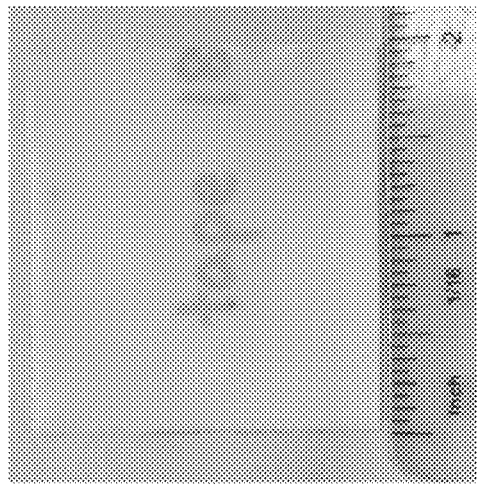
FIG. 21E illustrates a photograph of the tape in FIG. 22C after firing at 950° C. for 1 h in $O_2/N_2$ (3:1).

FIGS. 21A-E illustrate tapes from powders that were aged differently. FIG. 21A illustrates a photograph of a batch sintered tape formed from a tape containing a 110° C. 4 day aged powder and 5.5 wt % $Li_2CO_3$. FIG. 21B illustrates a fracture cross section SEM image of the dark area in FIG. 21A. FIG. 21C illustrates a photograph of a batch sintered tape formed from a tape including a 50° C. 30 day aged powder and 5.5 wt % $Li_2CO_3$. FIG. 21D illustrates a fracture cross-section SEM image of the dark area in FIG. 21C. FIG. 21E illustrates a photograph of the tape in FIG. 21C after firing at 950° C. for 1 h in $O_2/N_2$ (3:1). The sintering conditions were the same as the batch sintering described above. For grafoil-sandwiched garnet tape sintering, the as-sintered tape should be in black color. Tape that was not well-sintered shows a whiteish color due to a porous structure. The tape with the 110° C. 4-day-aged powder, due to the powder having less volatiles in it, the same amount $Li_2CO_3$ turned to be less excess Li compared to the stoichiometry of garnet. As a result, the tape was not sintered well. The obtained as-fired tape is whiteish with a blackish color area at the center, as shown in FIG. 21A. The SEM image FIG. 21B is from the black area fracture surface, showing a porous structure. As a comparison, the tape with the 50° C. 30-day-aged powder appeared to have a uniform black color after firing, as shown in FIG. 21C. The SEM image of the fractured cross section shows a dense structure with porosity of ~1.5% and fine grain microstructure, as shown in FIG. 21D. After post firing in $O_2/N_2$ at 950° C. for 1 hr, the black tape turned into white color, as shown in FIG. 21E. This tape thickness was 120 microns.

Example II-5. Air Passivated Garnet Composition

Figure 22A:
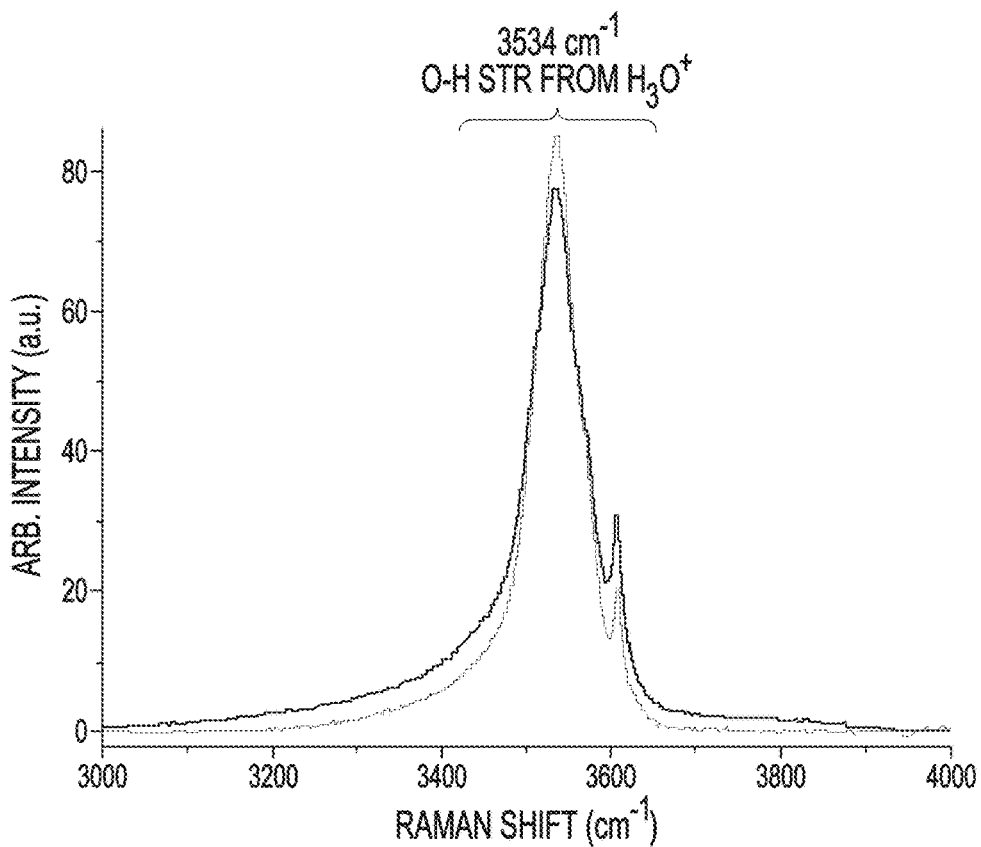
FIGS. 22A-C illustrate Raman spectra of air passivated 0.5Ta-LLZO garnet powder at 3000-4000 $cm^{-1}$, 900-1600 $cm^{-1}$, and 100-900 $cm^{-1}$, respectively.
Figure 22B:
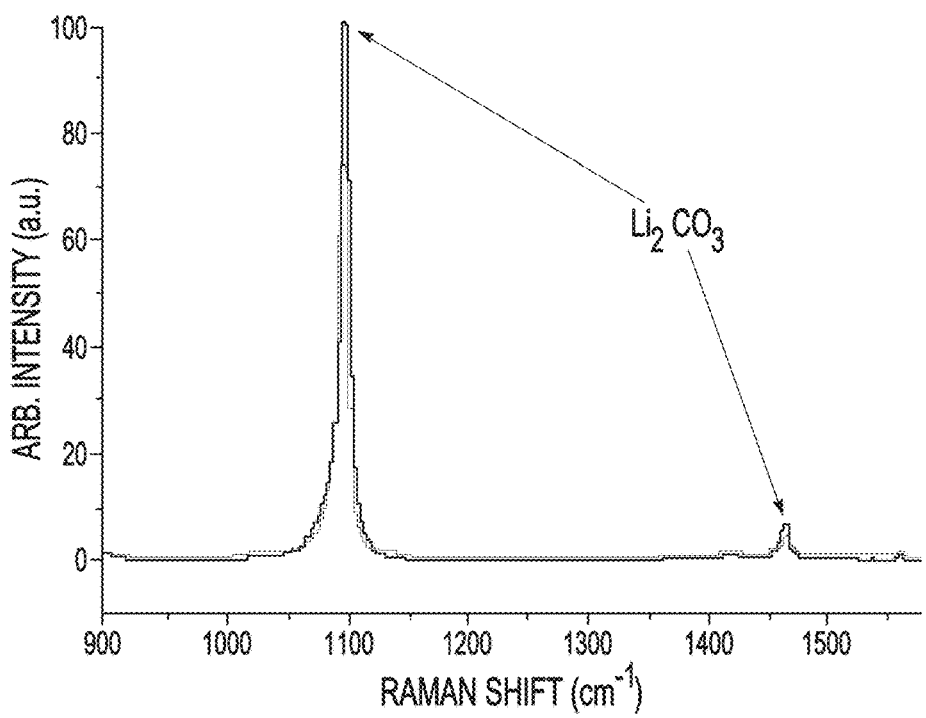
Figure 22C:
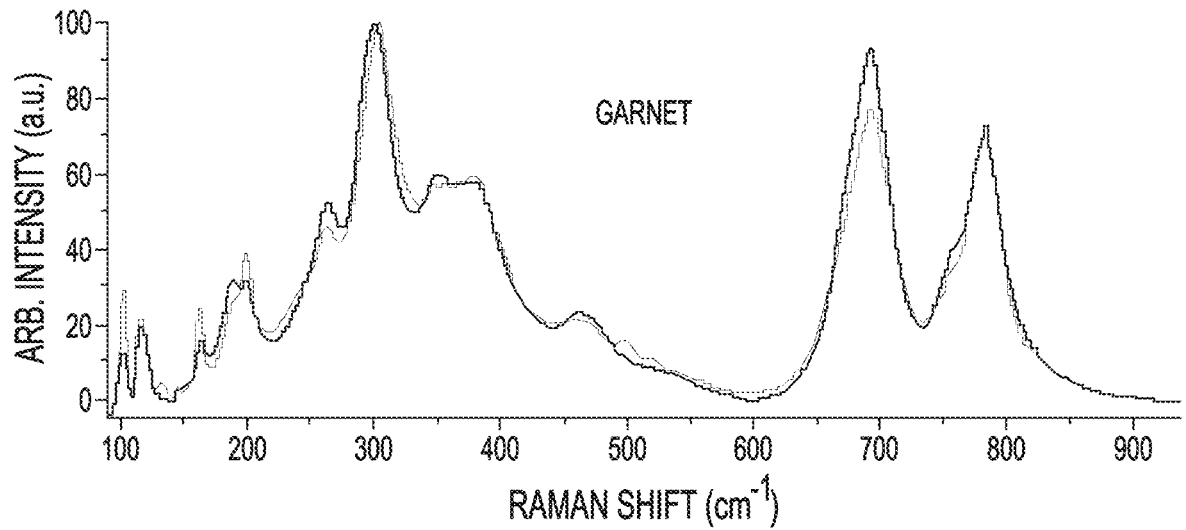

FIGS. 22A-C illustrate Raman spectra of air passivated (30 d at 50° C. in air) 0.5Ta-LLZO garnet powder having a core-shell structure at 3000-4000 $cm^{-1}$, 900-1600 $cm^{-1}$, and 100-900 $cm^{-1}$, respectively. FIG. 22A clearly illustrates the existence of $H_3O^+$ (hydronium) species in the powder, which are accompanied with strong $Li_2CO_3$ peaks as shown in FIG. 22B.

Figure 23A:
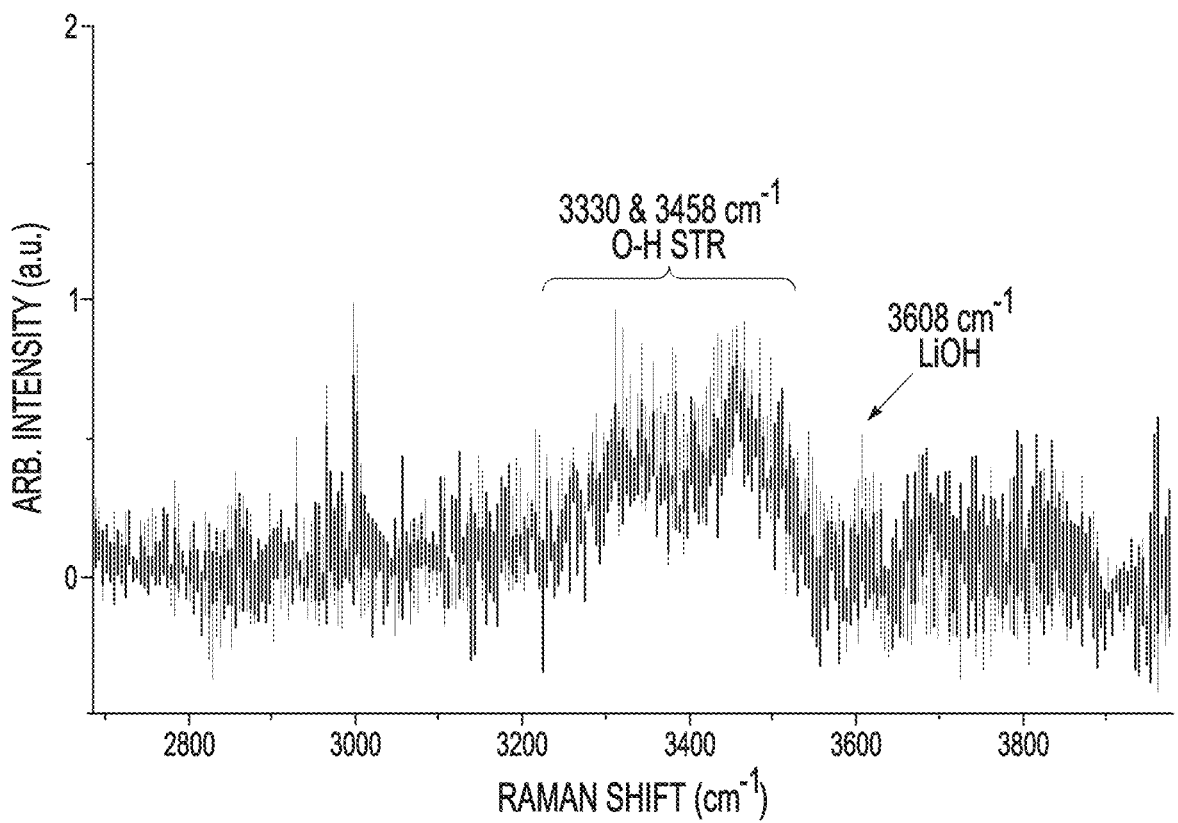
FIGS. 23A-B illustrate Raman spectra at 2750-4000 $cm^{-1}$ and 925-1300 $cm^{-1}$, respectively, from a garnet that was slightly reacted with air (7 d in air at room temperature).
Figure 23B:
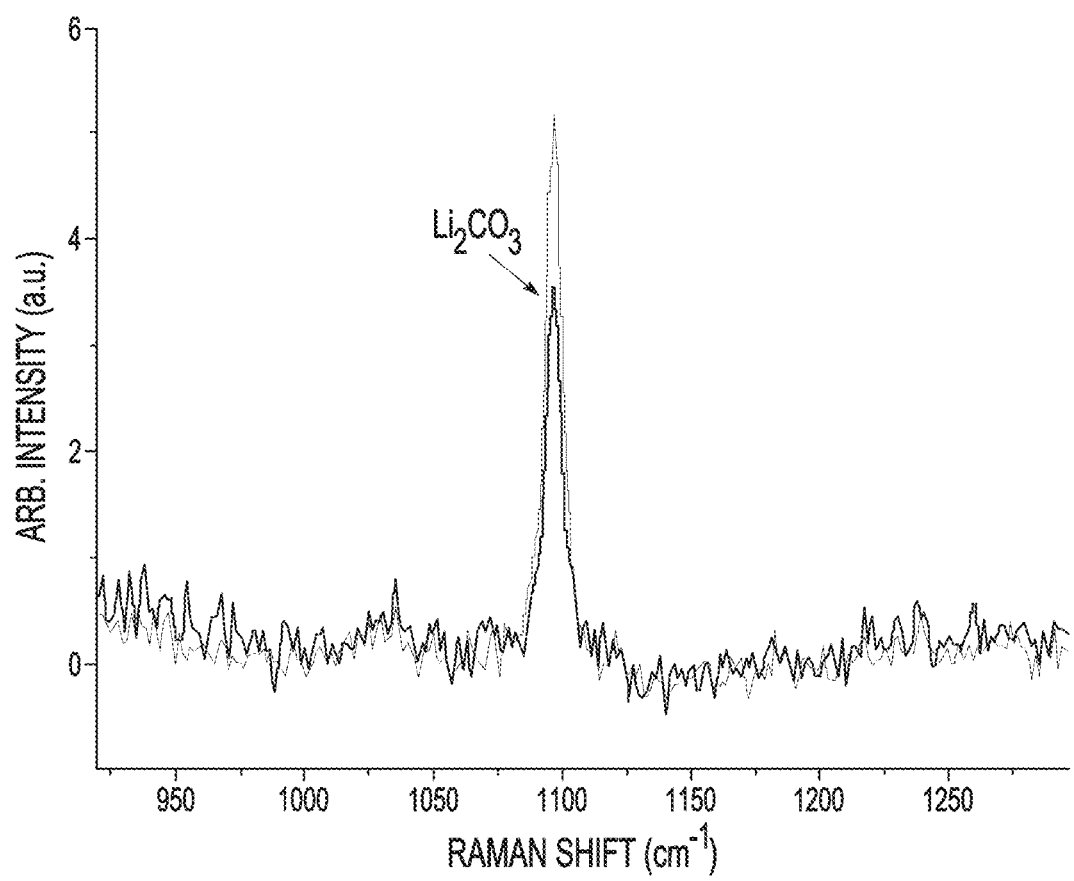

FIGS. 23A-B illustrate Raman spectra at 2750-4000 $cm^{-1}$ and 925-1300 $cm^{-1}$, respectively, from a garnet that was slightly reacted with air (7 d in air at room temperature), in which no $H_3O^+$ was observed. This result indicated that the ion-exchange reaction may include both $H^+$—$Li^+$ and $H_3O^+$—$Li^+$ ion exchange, which results in H-LLZO and $H_3O^+$-LLZO garnet. For fully passivated garnet, $H_3O^+$-LLZO is dominant.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Exemplary Aspects

The following exemplary aspects are provided, the numbering of which is not to be construed as designating levels of importance:

Aspect 1 provides a passivated $Li_7La_3Zr_2O_{12}$ (LLZO) particle comprising:
an LLZO core, wherein the LLZO is optionally doped with one or more elements; and a shell comprising H-LLZO, $H_3O^+$-LLZO, and/or $Li_2CO_3$.

Aspect 2 provides the passivated particle of Aspect 1, wherein the particle has a diameter of 0.1 micron to 5 microns.

Aspect 3 provides the passivated particle of any one of Aspects 1-2, wherein the LLZO is undoped and has the formula $Li_7La_3Zr_2O_{12}$.

Aspect 4 provides the passivated particle of any one of Aspects 1-3, wherein the LLZO is doped with the one or more elements.

Aspect 5 provides the passivated particle of any one of Aspects 1-4, wherein the LLZO is doped with Al, Ga, Ta, Nb, W, Ca, or a combination thereof.

Aspect 6 provides the passivated particle of any one of Aspects 1-5, wherein the LLZO is doped with Ta.

Aspect 7 provides the passivated particle of any one of Aspects 1-6, wherein the LLZO has the formula $Li_{6.7-6.3}La_3Zr_{1.7-1.3}Ta_{0.3-0.7}O_{12}$ or $Li_{6.5}La_3Zr_{1.5}Ta_{0.5}O_{12}$.

Aspect 8 provides the passivated particle of any one of Aspects 1-7, wherein the shell comprises $Li_2CO_3$, and wherein the particle comprises an H-LLZO and/or $H_3O^+$-LLZO layer between the core and the shell.

Aspect 9 provides the passivated particle of any one of Aspects 1-8, wherein the LLZO core is 20 wt % to 99.99 wt % of the particle.

Aspect 10 provides the passivated particle of any one of Aspects 1-9, wherein the LLZO core is 80 wt % to 99.99 wt % of the particle.

Aspect 11 provides the passivated particle of any one of Aspects 1-10, wherein the shell is predominantly H-LLZO and/or $H_3O^+$-LLZO.

Aspect 12 provides the passivated particle of any one of Aspects 1-11, wherein the shell further comprises $La_2Zr_2O_7$, $La_2O_3$, or a combination thereof.

Aspect 13 provides the passivated particle of any one of Aspects 1-12, wherein the shell is 0.01 wt % to 80 wt % of the particle.

Aspect 14 provides the passivated particle of any one of Aspects 1-13, wherein the shell is 0.01 wt % to 20 wt % of the particle.

Aspect 15 provides the passivated particle of any one of Aspects 1-14, wherein the shell has a thickness of 1 nm to 2.5 microns.

Aspect 16 provides the passivated particle of any one of Aspects 1-15, wherein the shell has a thickness of 10 nm to 40 nm.

Aspect 17 provides the passivated particle of any one of Aspects 1-16, wherein the shell is formed from passivation of the LLZO.

Aspect 18 provides the passivated particle of Aspect 17, wherein the total amount of Li present in the passivated LLZO particle is equal to a stoichiometric amount of Li in the LLZO.

Aspect 19 provides a tape casting powder comprising a plurality of the passivated LLZO particles of any one of Aspects 1-18, optionally further comprising sufficient excess lithium source such that the tape casting powder has an amount of Li that is 1% to 40% in excess of a stoichiometric amount of Li in the LLZO, wherein the excess lithium source comprises $Li_2CO_3$, LiOH, $Li_2O$, LiCl, $LiNO_3$, Li-citrate, Li-acetate, Li-oleate, LiF, $Li_2SO_4$, or combinations thereof.

Aspect 20 provides a tape casting slip composition comprising a plurality of the passivated LLZO particles of any one of Aspects 1-18.

Aspect 21 provides the tape casting slip composition of Aspect 20, wherein the passivated LLZO particles are 1-100 wt % of the tape casting slip composition.

Aspect 22 provides the tape casting slip composition of any one of Aspects 20-21, wherein the passivated LLZO particles are 30 wt % to 60 wt % of the tape casting slip composition.

Aspect 23 provides the tape casting slip composition any one of Aspects 20-22, further comprising excess lithium source, a dispersant, a plasticizer, a solvent, a binder, or a combination thereof.

Aspect 24 provides the tape casting slip composition of Aspect 23, wherein the tape casting slip composition comprises the excess lithium source, wherein the excess lithium source is 1 wt % to 10 wt % of the tape casting slip composition, wherein the excess lithium source comprises $Li_2CO_3$, LiOH, $Li_2O$, LiCl, $LiNO_3$, Li-citrate, Li-acetate, Li-oleate, LiF, $Li_2SO_4$, or combinations thereof.

Aspect 25 provides the tape casting slip composition of Aspect 24, wherein the excess lithium source is 1 wt % to 5 wt % of the tape casting slip composition Aspect 26 provides the tape casting slip composition of any one of Aspects 23-25, wherein the tape casting slip composition comprises the excess lithium source, wherein a sufficient amount of the excess lithium source is present such that the tape casting slip composition comprises an amount of Li that is 1% to 40% in excess based on a stoichiometric amount of Li in the LLZO.

Aspect 27 provides the tape casting slip composition of any one of Aspects 23-26, wherein the tape casting slip composition comprises the dispersant, wherein the dispersant comprises a water-soluble linear polymer comprising one or more polar groups thereon.

Aspect 28 provides the tape casting slip composition of any one of Aspects 23-27, wherein the dispersant is 0.1 wt %-10 wt % of the tape casting slip composition.

Aspect 29 provides the tape casting slip composition of Aspect 28, wherein the dispersant is 0.5 wt % to 5 wt % of the tape casting slip composition.

Aspect 30 provides the tape casting slip composition of any one of Aspects 23-29, wherein the tape casting slip composition comprises the plasticizer, wherein the plasticizer comprises n-butyl stearate.

Aspect 31 provides the tape casting slip composition of any one of Aspects 23-30, wherein the plasticizer is 0.1 wt % to 10 wt % of the tape casting slip composition.

Aspect 32 provides the tape casting slip composition of Aspect 31, wherein the plasticizer is 0.5 wt % to 5 wt % of the tape casting slip composition.

Aspect 33 provides the tape casting slip composition of any one of Aspects 23-32, wherein the tape casting slip composition comprises the solvent, wherein the solvent comprises n-propyl propionate.

Aspect 34 provides the tape casting slip composition of any one of Aspects 23-33, wherein the solvent is 10 wt % to 80 wt % of the tape casting slip composition.

Aspect 35 provides the tape casting slip composition of Aspect 34, wherein the solvent is 30 wt % to 50 wt % of the tape casting slip composition.

Aspect 36 provides the tape casting slip composition of any one of Aspects 23-35, wherein the tape casting slip composition comprises the binder, wherein the binder comprises an iso-butyl/n-butyl methacrylate copolymer.

Aspect 37 provides the tape casting slip composition of any one of Aspects 23-36, wherein the binder is 1 wt % to 20 wt % of the tape casting slip composition.

Aspect 38 provides the tape casting slip composition of Aspect 37, wherein the binder is 5 wt % to 15 wt % of the tape casting slip composition.

Aspect 39 provides a green tape comprising the tape casting powder of Aspect 19, the tape casting slip composition of any one of Aspects 20-38, or a dried product thereof.

Aspect 40 provides the green tape or dried product thereof of Aspect 39, wherein the green tape and/or dried product thereof retains flexibility without brittleness for at least 1 month after the formation thereof.

Aspect 41 provides the green tape or dried product thereof of any one of Aspects 39-40, wherein the green tape and/or dried product thereof has a thickness of 25 microns to 150 microns.

Aspect 42 provides the green tape or dried product thereof of any one of Aspects 39-41, wherein the green tape and/or dried product thereof has a thickness of 40 microns to 130 microns.

Aspect 43 provides a method of forming the passivated particle of any one of Aspects 1-18, the method comprising:
heating LLZO in air and/or $CO_2$ at room temperature to 650° C. for a suitable duration to form the passivated particle, wherein the LLZO is optionally doped with one or more elements.

Aspect 44 provides the method of Aspect 43, wherein the LLZO has a particle size of 0.1 micron to 5 microns.

Aspect 45 provides the method of any one of Aspects 43-44, wherein the LLZO has a particle size of 0.3 microns to 0.9 microns.

Aspect 46 provides the method of any one of Aspects 43-45, wherein the LLZO is a milled LLZO.

Aspect 47 provides the method of any one of Aspects 43-46, wherein the LLZO is a jet milled LLZO.

Aspect 48 provides the method of any one of Aspects 43-47, wherein the LLZO is undoped and has the formula $Li_7La_3Zr_2O_{12}$.

Aspect 49 provides the method of any one of Aspects 43-48, wherein the LLZO is doped with the one or more elements.

Aspect 50 provides the method of any one of Aspects 43-49, wherein the LLZO is doped with Al, Ga, Ta, Nb, W, Ca, or a combination thereof.

Aspect 51 provides the method of any one of Aspects 43-50, wherein the LLZO is doped with Ta.

Aspect 52 provides the method of any one of Aspects 43-51, wherein the LLZO has the formula $Li_{6.5}La_3Zr_{1.5}Ta_{0.5}O_{12}$.

Aspect 53 provides the method of any one of Aspects 43-52, wherein the LLZO has the same composition as the LLZO core of the passivated particle.

Aspect 54 provides the method of any one of Aspects 43-53, wherein the heating comprises heating for 0.5 hours to 1 week.

Aspect 55 provides the method of any one of Aspects 43-54, wherein the heating comprises heating in air at room temperature to 300° C.

Aspect 56 provides the method of Aspect 55, wherein the heating comprises heating for 24 hours to 30 days.

Aspect 57 provides the method of any one of Aspects 55-56, wherein the heating comprises heating for at least 48 hours.

Aspect 58 provides the method of any one of Aspects 55-57, wherein the core is greater than or equal to 80 wt % of the passivated particle.

Aspect 59 provides the method of any one of Aspects 43-58, wherein the heating comprises heating in $CO_2$ at 500° C. to 650° C.

Aspect 60 provides the method of Aspect 59, wherein the heating comprises heating for 0.5 to 10 hours.

Aspect 61 provides the method of any one of Aspects 59-60, wherein the heating comprises heating for 1 to 5 hours.

Aspect 62 provides the method of any one of Aspects 59-61, wherein the core is greater than or equal to 20 wt % of the passivated particle.

Aspect 63 provides a method of tape casting, the method comprising:
tape casting the tape casting slip composition of Aspect 20 to form the green tape or dried product thereof of any one of Aspects 39-42.

Aspect 64 provides a method of tape casting, the method comprising:
tape casting a tape casting slip composition to form a green tape or dried product thereof, the tape casting slip composition comprising a plurality of passivated $Li_7La_3Zr_2O_{12}$ (LLZO) particles each comprising
an LLZO core, wherein the LLZO is optionally doped with one or more elements; and
a shell comprising H-LLZO, $H_3O^+$-LLZO, and/or $Li_2CO_3$.

Aspect 65 provides the method of any one of Aspects 63-64, wherein the green tape and/or dried product thereof has a thickness of 25 microns to 150 microns.

Aspect 66 provides the method of any one of Aspects 63-65, wherein the green tape and/or dried product thereof has a thickness of 40 microns to 130 microns.

Aspect 67 provides the method of any one of Aspects 63-66, further comprising sintering the green tape to form a tape cast LLZO film.

Aspect 68 provides the method of Aspect 67, further comprising performing a binder burnout prior to the sintering, wherein the binder burnout comprises heating the green tape in an inert gas to a temperature of 400 to 800° C. for a sufficient time to substantially remove binder.

Aspect 69 provides the method of any one of Aspects 67-68, wherein the LLZO film has a thickness of 25 microns to 125 microns.

Aspect 70 provides the method of any one of Aspects 67-69, wherein the LLZO film has a thickness of 40 microns to 100 microns.

Aspect 71 provides the method of any one of Aspects 67-70, wherein the sintering comprises fast firing in air or inert gas.

Aspect 72 provides the method of any one of Aspects 67-71, wherein the sintering comprises fast firing in air.

Aspect 73 provides the method of any one of Aspects 67-72, wherein the sintering is performed for no longer than 20 minutes.

Aspect 74 provides the method of Aspect 73, wherein the method is free of additional heating after the sintering.

Aspect 75 provides the method of any one of Aspects 67-74, wherein the sintering comprises heating to 1000° C. to 1400° C. using a temperature ramp up of 100° C./min to 1000° C./min for 0.5 min to 7 days, or 1000° C. to 1400° C. using a temperature ramp up of 100° C./min to 1000° C./min for 0.5 min to 30 min.

Aspect 76 provides the method of any one of Aspects 67-75, wherein the sintering comprises heating to 1100° C. to 1300° C. using a temperature ramp up of 100° C./min to 1000° C./min for 1 min to 20 min.

Aspect 77 provides the method of any one of Aspects 67-76, wherein the sintering is performed in the absence of mother powder.

Aspect 78 provides the method of any one of Aspects 67-77, wherein the method comprises forming the LLZO film without using hot pressing.

Aspect 79 provides a method of tape casting, the method comprising
- tape casting a tape casting slip composition to form a green tape, the tape casting slip composition comprising a plurality of passivated $Li_7La_3Zr_2O_{12}$ (LLZO) particles each comprising
  - an LLZO core, wherein the LLZO is optionally doped with one or more elements, and
  - a shell comprising H-LLZO, $H_3O^+$-LLZO, and/or $Li_2CO_3$,
- wherein the tape casting slip composition comprises an excess lithium source in sufficient quantity such that the tape casting slip composition comprises an amount of Li that is 1% to 40% in excess based on a stoichiometric amount of Li in the LLZO core, wherein the excess lithium source comprises $Li_2CO_3$, LiOH, $Li_2O$, LiCl, $LiNO_3$, Li-citrate, Li-acetate, Li-oleate, LiF, $Li_2SO_4$, or combinations thereof;
- drying the green tape; and
- sintering the green tape in the absence of a mother powder, the sintering comprising heating to 1150° C. to 1300° C. using a temperature ramp up of 100° C./min to 1000° C./min for 1 min to 20 min.

Aspect 80 provides a cast LLZO film formed by the method of any one of Aspects 67-79.

Aspect 81 provides the cast LLZO film of Aspect 80, wherein the cast LLZO film comprises a grain size of 1.5 microns or less.

Aspect 82 provides the cast LLZO film of any one of Aspects 80-81, wherein the cast LLZO film comprises a lithium ion conductivity of $1\times10^{-3}$ S/cm to $1\times10^{-5}$ S/cm at room temperature.

Aspect 83 provides the cast LLZO film of any one of Aspects 80-82, wherein the cast LLZO film comprises a lithium ion conductivity of $1\times10^{-4}$ S/cm to $9\times10^{-4}$ S/cm at room temperature.

Aspect 84 provides a lithium battery comprising the cast LLZO film of any one of Aspects 80-83.

Aspect 85 provides the passivated LLZO particle, tape casting powder, tape casting composition, green tape or dried product thereof, method of forming the passivated LLZO particle, method of tape casting, cast LLZO film, or lithium battery of any one or any combination of Aspects 1-84 optionally configured such that all elements or options recited are available to use or select from.

What is claimed is:

1. A passivated $Li_7La_3Zr_2O_{12}$ (LLZO) particle comprising:
   - an LLZO core, wherein the LLZO is optionally doped with one or more elements;
   - a shell comprising $Li_2CO_3$; and
   - an $H_3O^+$-LLZO and/or H-LLZO layer between the core and the shell.

2. The passivated particle of claim 1, wherein the particle has a diameter of 0.1 micron to 5 microns.

3. The passivated particle of claim 1, wherein the LLZO is doped with Al, Ga, Ta, Nb, W, Ca, or a combination thereof.

4. The passivated particle of claim 1, wherein the LLZO has the formula $Li_{6.7-6.3}La_3Zr_{1.7-1.3}Ta_{0.3-0.7}O_{12}$ or $Li_{6.5}La_3Zr_{1.5}Ta_{0.5}O_{12}$.

5. The passivated particle of claim 1, wherein the LLZO core is 20 wt % to 99.99 wt % of the particle, wherein the shell is 0.01 wt % to 80 wt % of the particle.

6. A tape casting powder comprising a plurality of the passivated LLZO particles of claim 1, further comprising sufficient excess lithium source such that the tape casting powder has an amount of Li that is 1% to 40% in excess of a stoichiometric amount of Li in the LLZO, wherein the excess lithium source comprises $Li_2CO_3$, LiOH, $Li_2O$, LiCl, $LiNO_3$, Li-citrate, Li-acetate, Li-oleate, LiF, $Li_2SO_4$, or combinations thereof.

7. A tape casting slip composition comprising a plurality of the passivated LLZO particles of claim 1.

8. The tape casting slip composition of claim 7, wherein the tape casting slip composition comprises an excess lithium source, wherein a sufficient amount of the excess lithium source is present such that the tape casting slip composition comprises an amount of Li that is 1% to 40% in excess based on a stoichiometric amount of Li in the LLZO, wherein the excess lithium source comprises $Li_2CO_3$, LiOH, $Li_2O$, LiCl, $LiNO_3$, Li-citrate, Li-acetate, Li-oleate, LiF, $Li_2SO_4$, or combinations thereof.

9. A method of forming the passivated particle of claim 1, the method comprising:
   - heating LLZO in air or $CO_2$ at room temperature to 650° C. for a suitable duration to form the passivated particle, wherein the LLZO is optionally doped with one or more elements.

10. The method of claim 9, wherein the heating comprises heating in air at room temperature to 300° C. for 24 hours to 30 days.

11. A method of tape casting, the method comprising
- tape casting a tape casting slip composition to form a green tape, the tape casting slip composition comprising a plurality of passivated $Li_7La_3Zr_2O_{12}$ (LLZO) particles each comprising:
  - an LLZO core, wherein the LLZO is optionally doped with one or more elements,
  - a shell comprising $Li_2CO_3$, and
  - an $H_3O^+$-LLZO and/or H-LLZO layer between the core and the shell,
- wherein the tape casting slip composition comprises an excess lithium source in sufficient quantity such that the tape casting slip composition comprises an amount of Li that is 1% to 40% in excess based on a stoichiometric amount of Li in the LLZO core, wherein the excess lithium source comprises $Li_2CO_3$, LiOH, $Li_2O$, LiCl, $LiNO_3$, Li-citrate, Li-acetate, Li-oleate, LiF, $Li_2SO_4$, or combinations thereof;
- drying the green tape; and
- sintering the green tape in the absence of a mother powder.

12. A cast LLZO film formed by the method of claim 9.

13. A lithium battery comprising the cast LLZO film of claim 12.

14. The method of claim 11, wherein the sintering comprises heating in air to 1000° C. to 1400° C. using a temperature ramp up of 100° C./min to 1000° C./min for 0.5 min to 30 min, wherein the sintering is performed in the absence of the mother powder.

15. The passivated particle of claim 1, wherein the shell has a thickness of from 1 nm to 2.5 micrometers.

16. The passivated particle of claim 1, wherein the shell has a thickness of from 10 nm to 40 nm.

17. The passivated particle of claim 1, wherein a total amount of Li present in the passivated LLZO particle is equal to a stoichiometric amount of Li in the LLZO.

\* \* \* \* \*